(12) United States Patent
Gieseke et al.

(10) Patent No.: US 6,540,801 B2
(45) Date of Patent: *Apr. 1, 2003

(54) AEROSOL SEPARATOR; AND METHOD

(75) Inventors: Steven Scott Gieseke, Richfield, MN (US); Robert Allen Dushek, Richfield, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/060,122

(22) Filed: Jan. 28, 2002

(65) Prior Publication Data

US 2002/0092280 A1 Jul. 18, 2002

Related U.S. Application Data

(63) Continuation of application No. 09/756,098, filed on Jan. 8, 2001, now Pat. No. 6,355,076, which is a continuation of application No. 09/010,098, filed on Jan. 21, 1998, now Pat. No. 6,171,355, which is a continuation-in-part of application No. 08/884,294, filed on Jun. 27, 1997, now Pat. No. 5,853,439.

(51) Int. Cl.$^7$ .............................................. B01D 46/00
(52) U.S. Cl. ........................ 55/330; 55/350.1; 55/385.3; 55/480; 55/505; 123/198 E
(58) Field of Search ............................... 55/330, 350.1, 55/385.3, 480, 481, 502, DIG. 19; 123/198 E

(56) References Cited

U.S. PATENT DOCUMENTS 991,572 A 5/1911 Weisenstein
1,838,751 A 12/1931 Earnest
1,856,527 A 5/1932 Winslow
2,060,883 A 11/1936 Lowther
2,080,988 A 5/1937 Schulz (List continued on next page.)

FOREIGN PATENT DOCUMENTS

| DE | 196 19 770 A1 | 11/1997 |
|---|---|---|
| DE | 297 14 886 U1 | 11/1997 |
| EP | 0 576 783 A1 | 1/1994 |
| EP | 0 611 876 A1 | 8/1994 |
| GB | 613386 | 11/1948 |
| GB | 661649 | 11/1951 |
| GB | 1 566 220 | 4/1980 |
| GB | 2 106 634 A | 4/1983 |
| RU | 1711661 A3 | 2/1992 |
| WO | WO 01/47618 | 7/2001 |

Primary Examiner—David A. Simmons
Assistant Examiner—Minh-Chau T. Pham
(74) Attorney, Agent, or Firm—Merchant & Gould, P.C.

(57) ABSTRACT

An arrangement for separating a hydrophobic liquid phase from a gaseous stream includes a coalescer filter, a housing, a gas flow direction arrangement, and a liquid collection arrangement. The coalescer filter includes a non-woven media of fibers. The housing includes an interior having a gas flow inlet and a gas flow outlet. The liquid collection arrangement is positioned within the housing construction and is oriented for receiving liquid collected from the coalescer filter and drained therefrom. Methods for conducting the separations are also provided.

20 Claims, 21 Drawing Sheets

U.S. PATENT DOCUMENTS

| | | |
|---|---|---|
| 2,120,050 A | 6/1938 | Lowther |
| 2,178,033 A | 10/1939 | Decker |
| 2,250,200 A | 7/1941 | Lowther |
| 2,252,974 A | 8/1941 | Lowther |
| RE21,965 E | 12/1941 | Lowther |
| 2,273,210 A | 2/1942 | Lowther et al. |
| 2,359,485 A | 10/1944 | Lowther |
| D148,396 S | 1/1948 | Stevens et al. |
| 2,539,378 A | 1/1951 | Stootman |
| 2,547,587 A | 4/1951 | Lowther |
| 3,115,873 A | 12/1963 | Hahn et al. |
| 3,167,416 A | 1/1965 | Humbert, Jr. et al. |
| 3,263,402 A | 8/1966 | Lindamood et al. |
| 3,266,229 A | 8/1966 | Witkowski |
| 3,450,117 A | 6/1969 | McHattie et al. |
| 3,509,967 A | 5/1970 | Ballard |
| 3,589,108 A | 6/1971 | Dingel et al. |
| 3,721,069 A | 3/1973 | Walker |
| 3,754,538 A | 8/1973 | Ephraim, Jr. et al. |
| 3,789,582 A | 2/1974 | Graybill |
| 3,793,813 A | 2/1974 | McAllister |
| 3,796,025 A | 3/1974 | Kasten |
| 3,822,532 A | 7/1974 | Weisgerber |
| 4,018,580 A | 4/1977 | Burkholz |
| 4,047,912 A | 9/1977 | Markland |
| 4,095,966 A | 6/1978 | Isley |
| 4,111,815 A | 9/1978 | Walker et al. |
| 4,184,858 A | 1/1980 | Walker |
| 4,203,739 A | 5/1980 | Erdmannsdorfer |
| 4,233,042 A | 11/1980 | Tao |
| 4,236,901 A | 12/1980 | Kato et al. |
| 4,269,607 A | 5/1981 | Walker |
| 4,373,499 A | 2/1983 | Bendig |
| 4,378,983 A | 4/1983 | Martin |
| 4,396,407 A | 8/1983 | Reese |
| 4,401,093 A | 8/1983 | Gates, Jr. et al. |
| 4,404,950 A | 9/1983 | Dallman |
| 4,409,950 A | 10/1983 | Goldberg |
| 4,425,145 A | 1/1984 | Reese |
| 4,445,912 A | 5/1984 | Volk et al. |
| 4,585,466 A | 4/1986 | Syred et al. |
| 4,602,595 A | 7/1986 | Aoki et al. |
| 4,627,406 A | 12/1986 | Namiki et al. |
| 4,632,682 A | 12/1986 | Erdmannsdorfer |
| 4,653,457 A | 3/1987 | Stege |
| 4,692,175 A | 9/1987 | Frantz |
| 4,704,143 A | 11/1987 | Percy |
| 4,724,807 A | 2/1988 | Walker |
| 4,759,782 A | 7/1988 | Miller et al. |
| D298,051 S | 10/1988 | Matheson et al. |
| 4,861,359 A | 8/1989 | Tettman |
| 4,872,890 A | 10/1989 | Lamprecht et al. |
| 4,878,929 A | 11/1989 | Tofsland et al. |
| 4,925,469 A | 5/1990 | Clement et al. |
| 4,995,891 A | 2/1991 | Jaynes |
| 5,019,141 A | 5/1991 | Granville et al. |
| 5,035,729 A | 7/1991 | Hodgkins |
| 5,039,323 A | 8/1991 | Ulitsky et al. |
| 5,046,474 A | 9/1991 | Percy |
| 5,053,126 A | 10/1991 | Krasnoff |
| 5,080,082 A | 1/1992 | Mueller et al. |
| 5,090,393 A | 2/1992 | Holch |
| 5,125,941 A | 6/1992 | Ernst et al. |
| 5,140,957 A | 8/1992 | Walker |
| 5,277,157 A | 1/1994 | Teich |
| 5,284,997 A | 2/1994 | Spearman et al. |
| 5,347,973 A | 9/1994 | Walker, Jr. |
| 5,417,848 A | 5/1995 | Erdmannsdorfer et al. |
| 5,429,101 A | 7/1995 | Uebelhoer et al. |
| 5,454,945 A | 10/1995 | Spearman |
| 5,460,147 A | 10/1995 | Bohl |
| 5,471,966 A | 12/1995 | Feuling |
| 5,472,463 A | 12/1995 | Herman et al. |
| 5,479,907 A | 1/1996 | Walker, Jr. |
| 5,494,020 A | 2/1996 | Meng |
| 5,494,497 A | 2/1996 | Lee |
| D368,266 S | 3/1996 | McClain et al. |
| 5,497,755 A | 3/1996 | Maloney |
| 5,509,948 A | 4/1996 | Keller et al. |
| 5,564,401 A | 10/1996 | Dickson |
| 5,579,744 A | 12/1996 | Trefz |
| 5,586,996 A | 12/1996 | Manookian, Jr. |
| RE35,433 E | 1/1997 | Alexander, III |
| 5,591,338 A | 1/1997 | Pruette et al. |
| 5,602,373 A | 2/1997 | Sauer et al. |
| 5,605,555 A | 2/1997 | Patel et al. |
| 5,609,658 A | 3/1997 | Takemura et al. |
| 5,633,341 A | 5/1997 | Abend |
| 5,640,937 A | 6/1997 | Slopsema |
| 5,660,607 A | 8/1997 | Jokschas et al. |
| 5,681,462 A | 10/1997 | Brockhoff et al. |
| 5,690,709 A | 11/1997 | Barnes |
| 5,707,521 A | 1/1998 | Erdmannsdorfer et al. |
| 5,713,985 A | 2/1998 | Hamilton |
| 5,750,024 A | 5/1998 | Spearman |
| 5,752,999 A | 5/1998 | Newby et al. |
| 5,759,217 A | 6/1998 | Joy |
| 5,795,369 A | 8/1998 | Taub |
| 5,800,584 A | 9/1998 | Hinderer et al. |
| 5,853,439 A | 12/1998 | Gieseke et al. |
| 5,865,863 A | 2/1999 | DeSousa et al. |
| D410,010 S | 5/1999 | Gieseke et al. |
| 5,902,361 A | 5/1999 | Pomplun et al. |
| 5,921,214 A | 7/1999 | Fujita et al. |
| D420,117 S | 2/2000 | Gieseke et al. |
| 6,143,049 A | 11/2000 | Gieseke |
| 6,187,073 B1 | 2/2001 | Gieseke et al. |
| D439,962 S | 4/2001 | Gieseke et al. |
| D439,963 S | 4/2001 | Gieseke et al. |
| D440,293 S | 4/2001 | Gieeke et al. |
| 6,290,739 B1 | 9/2001 | Gieseke et al. |

AEROSOL SEPARATOR; AND METHOD

This application is a continuation of application Ser. No. 09/756,098, filed Jan. 8, 2001 now U.S. Pat. No. 6,355,076. Application Ser. No. 09/756,098 is a continuation of application Ser. No. 09/010,098, filed Jan. 21, 1998 U.S. Pat. No. 6,171,355. Application Ser. No. 09/010,098 is a continuation-in-part of application Ser. No. 08/884,294, filed Jun. 27, 1997, U.S. Pat. No. 5,853,439. Application Ser. Nos. 09/756,098; 09/010,098; and 08/884,294 are incorporated herein by reference.

FIELD OF THE INVENTION

The present invention relates to systems and methods for separating hydrophobic fluids (such as oils) which are entrained as aerosols, from gas streams (for example, air streams). Preferred arrangements also provide for filtration of other fine contaminants, for example carbon material, from the gas streams. Methods for conducting the separations are also provided.

BACKGROUND OF THE INVENTION

Certain gas streams, such as blow-by gases from diesel engines, carry substantial amounts of entrained oils therein, as aerosol. The majority of the oil droplets within the aerosol are generally within the size of 0.1–5.0 microns.

In addition, such gas streams also carry substantial amounts of fine contaminant, such as carbon contaminants. Such contaminants generally have an average particle size of about 0.5–3.0 microns.

In some systems, it is desirable to vent such gases to the atmosphere. In general, it is preferred that before the gases are vented to the atmosphere, they be cleaned of a substantial portion of the aerosol and/or organic particulate contaminants therein.

In other instances, it is desirable to direct the air or gas stream into equipment. When such is the case, it may be desirable to separate aerosol and/or particulates from the stream during the circulation, in order to provide such benefits as: reduced negative effects on the downstream equipment; improved efficiency; recapture of otherwise lost oils; and/or to address environmental concerns.

A variety of efforts have been directed to the above types of concerns. The variables toward which improvements are desired generally concern the following: (a) size/efficiency concerns; that is, a desire for good efficiency of separation while at the same time avoidance of a requirement for a large separator system; (b) cost/efficiency; that is, a desire for good or high efficiency without the requirement of substantially expensive systems; (c) versatility; that is, development of systems that can be adapted for a wide variety of applications and uses, without significant re-engineering; and, (d) cleanability/regeneratability; that is, development of systems which can be readily cleaned (or regenerated) if such becomes desired, after prolonged use.

SUMMARY OF THE INVENTION

An arrangement for separating a hydrophobic liquid phase from a gaseous stream comprises a coalescer filter, a housing construction, a gas flow direction arrangement, and a liquid collection arrangement. The coalescer filter preferably comprises a non-woven media of fibers. The housing construction defines an interior and has a gas flow inlet and a gas flow outlet. The gas flow direction arrangement is constructed and arranged to direct gas flow (for example crankcase blow-by gas flow) through the coalescer filter as the gas is directed into and through the housing construction. The liquid collection arrangement is positioned within the housing construction and is oriented for receiving liquid collected within the coalescer filter and drained therefrom.

Preferably, the coalescer filter comprises a panel construction removable from, and replaceable in, the arrangement.

Preferably, a liquid drain construction is in fluid communication with the liquid collection arrangement. The liquid drain construction is constructed and arranged to selectively drain collected hydrophobic liquid from the housing construction interior.

In certain preferred embodiments, the arrangement further includes a second filter. Preferably, the second filter is positioned within the housing construction and is located downstream from the coalescer filter. The gas flow direction arrangement is constructed and arranged to first direct gas flow through the coalescer filter and then to secondly direct gas flow through the second filter, as gas is directed into and through the housing construction.

Preferably, the coalescer filter has an upstream surface area of no more than 25% of an upstream surface area of the second filter. In certain preferred embodiments, the coalescer filter has an upstream surface area of about 0.1%–10%, typically about 0.5–1% and preferably about 0.8%, of an upstream surface area of the second filter.

Preferably, the second filter comprises pleated media. In certain arrangements, the second filter is removable and replaceable, and the housing is constructed and arranged with an openable end cover for access to remove the second filter without removal or dismounting of the coalescer filter. The first and second filters can be mechanically connected to be replaced as one unit; or, they can be separate constructions to be replaced separately.

In one preferred embodiment, the coalescer filter comprises a non-woven media of fibers having an average fiber diameter of less than 25 microns, typically and preferably within the range of 9–25 microns.

DETAILED DESCRIPTION

I. A Typical Application—Engine Crankcase Breather Filter

Pressure-charged diesel engines often generate "blow-by" gases, i.e., a flow of air-fuel mixture leaking past pistons from the combustion chambers. Such "blow-by gases" generally comprise a gas phase, for example air or combustion off gases,,carrying therein: (a) oil or fuel aerosol principally comprising 0.1–5.0 micron droplets; and, (b) carbon contaminant from combustion, typically comprising carbon particles, a majority of which are about 0.1–10 microns in size. Such "blow-by gases" are generally directed outwardly from the engine block, through a blow-by vent.

Herein when the term "hydrophobic" fluids is used in reference to the entrained liquid aerosol in gas flow, reference is meant to nonaqueous fluids, especially oils. Generally such materials are immiscible in water. Herein the term "gas" or variants thereof, used in connection with the carrier fluid, refers to air, combustion off gases, and other carrier gases for the aerosol.

The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates and volumes on the order of 0–50 cfm (typically 5 to 10 cfm) are fairly common.

Figure 1:
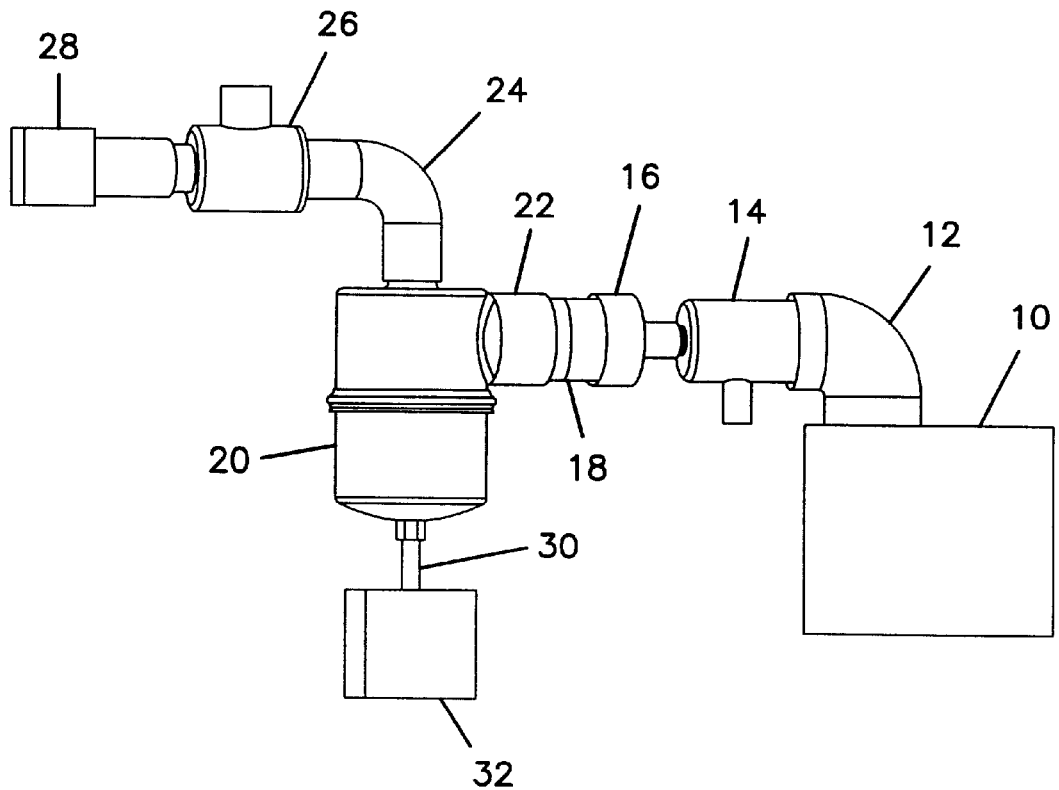
FIG. 1 is a schematic view of an engine system using an aerosol separator arrangement according to the present invention.

FIG. 1 illustrates a schematic indicating a typical system in which a coalescer/separator arrangement according to the present invention would be utilized. Referring to FIG. 1, an engine is-shown generally at 10. The engine 10 may generally comprise a diesel engine, although other types of engines are contemplated. The engine 10 gives off a blow-by gas, which may carry substantial amounts of entrained oils therein as aerosol, and also substantial amounts of fine contaminant, such as carbon contaminants. The blow-by gasses are vented through a connector 12 and through a check valve 14. The check valve 14 may also be further upstream in the system. Attached to the housing for the check valve 14 is a connector 16. Downstream of the Connector 16 and attached thereto is a coalescing filter 18. The coalescing filter 18 separates the blow-by gas into two components including a liquid component and a partially filtered gas component. A second stage filter 20 is attached to the coalescing filter 18 by way of another connector 22. The second stage filter 20 acts to further purify the somewhat filtered gas component from the coalescer filter. That is, it removes fine particles which may still be remaining in the gas component. The purified gas is then directed through a connector 24 through a pressure regulator 26 and into an engine intake system 28, such as a turbo. The liquid component from the coalescer filter 18 is directed through a line 30 and into an engine sump 32.

According to the present invention, an arrangement for separating a hydrophobic liquid phase from a gaseous stream (sometimes referred to herein as a coalescer/separator arrangement) is provided. In operation, a contaminated gas flow is directed-into the coalescer/separator arrangement. Within the arrangement, the fine oil phase or aerosol phase (i.e., hydrophobic phase) coalesces. The arrangement is constructed so that as the hydrophobic phase coalesces into droplets, it will drain as a liquid such that it can readily be collected and removed from the system. With preferred arrangements as described hereinbelow, the coalescer or coalescer/separator, especially with the oil phase in part loaded thereon, operates as a prefilter for carbon contaminant carried in the gas stream. Indeed, in preferred systems, as the oil is drained from the system, it will provide some self-cleaning of the coalescer because the oil will carry therein a portion of the trapped carbon contaminant. In preferred arrangements according to the present invention, the coalescer/separator arrangement is constructed with a removable media component, for ease of cleaning or regeneration. In some preferred systems at least a single downstream (or second) filter or polish filter is provided. In other systems, multiple downstream filters can be provided.

Figure 2:
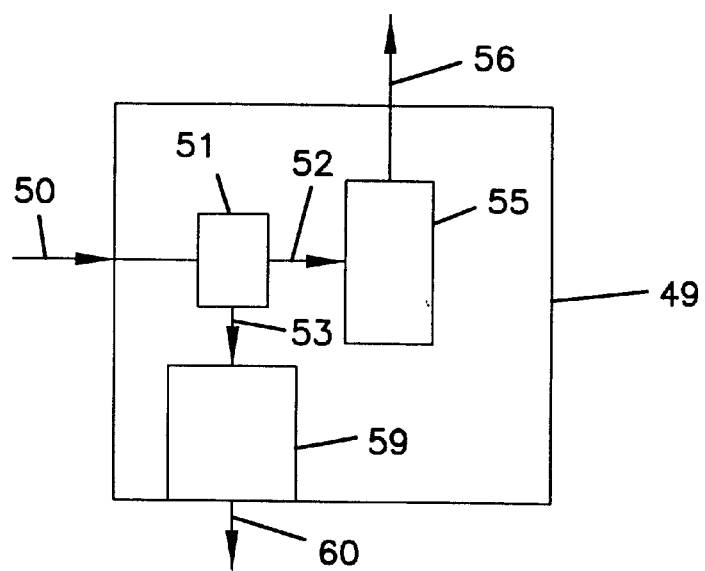
FIG. 2 is a schematic representation depicting application of principles in a separator arrangement according to the present invention.

The general principles of operation, of a system according to the present invention, will be understood by reference to the schematic of FIG. 2. In FIG. 2, a gas flow to be filtered is shown directed into the system 49 at 50. A coalescer or coalescer/filter is indicated generally at 51. As the air passes through coalescer 51, two material streams are generated: a somewhat filtered or purified gas stream 52; and, a liquid phase 53. The gas stream 52 is shown directed into a second stage filter 55 for polishing, with gas outflow from the arrangement indicated via line 56. At this point, the gas may be directed to downstream equipment or to the atmosphere. In typical systems such as those shown in FIG. 1, the gases in line 56 would be directed to an engine intake system. In other typical systems, the gases in line 56 would be directed to the atmosphere or exhaust.

The liquid phase (with any entrained solids) from coalescer 51 is shown directed via line 53 to a drain construction 59. The material is then directed via line 60 wherever desired. For example, it may be recycled to the crankcase to be reused. Alternatively, it may be collected separately for disposal.

In general, coalescer 51 comprises material in which the fine oil droplets carried within air 50 will tend to collect and coalesce into droplets. Useful materials and constructions for this are described below.

In general, preferably the support or substrate material in coalescer 51 is selected and configured in a manner such that the combination of coalescer 51 and collected oil droplet phase will operate as a prefilter for contaminants (especially carbon particles) also carried in line 50. The contaminants or carbon particles will tend to become entrained in the liquid flow, leaving the system through line 53. Thus, to some extent, in a system such as that described herein, coalescer 51 is self-cleaning. Alternately stated, the continuously collected oil phase will tend to wash some of the continuously collected carbon particle phase out of coalescer 51.

For typical systems, it is anticipated that the coalescer 51 will be designed such that with a typical gas flow therethrough, a substantial life for the coalescer 51 will, in part, result from the washing effect. However, it is also anticipated that-the system will not be "tuned" with an effort toward optimal operation through self-cleaning. That is, it is anticipated that coalescer 51 will, in preferred systems, be configured for periodic regeneration resulting from removal of filter media or coalescing material positioned therein and either cleaning or replacement. Alternately phrased, it is foreseen that in typical applications the material (media) of the coalescer will be chosen with a focus on achievement of high-efficiency aerosol removal, preferably at least 20%, more preferably at least 25–50%, by weight in typical use. This will also result in substantial carbon-particle removal. The carbon particle removal will in part be facilitated by the fact that substantial amounts of oil phase will coalesce within the media, and the oil phase will help trap the carbon material. It is foreseen that if the coalescer material is selected (tuned) to achieve highest efficiency carbon particle removal, especially on the order of about 60%, it might offer too great a restriction to gas flow, to be fully desirable as a coalescer filter.

II. An Example of a Multi-Stage Oil Aerosol Separator

Attention is now directed to FIGS. 3–15, in which a multi-stage oil aerosol separator or coalescer/separator according to the present invention is provided. The system is generally referenced herein as "multi-stage" because it not only includes an aerosol separator/filter arrangement according to the present invention; but, it also includes at least a single, and could include multiple, downstream or second stage filters, for further purification of the air stream. Oil separator or coalescer/separator arrangements as generally described herein may, alternatively, be utilized in overall assemblies that do not include downstream filters.

Figure 3:
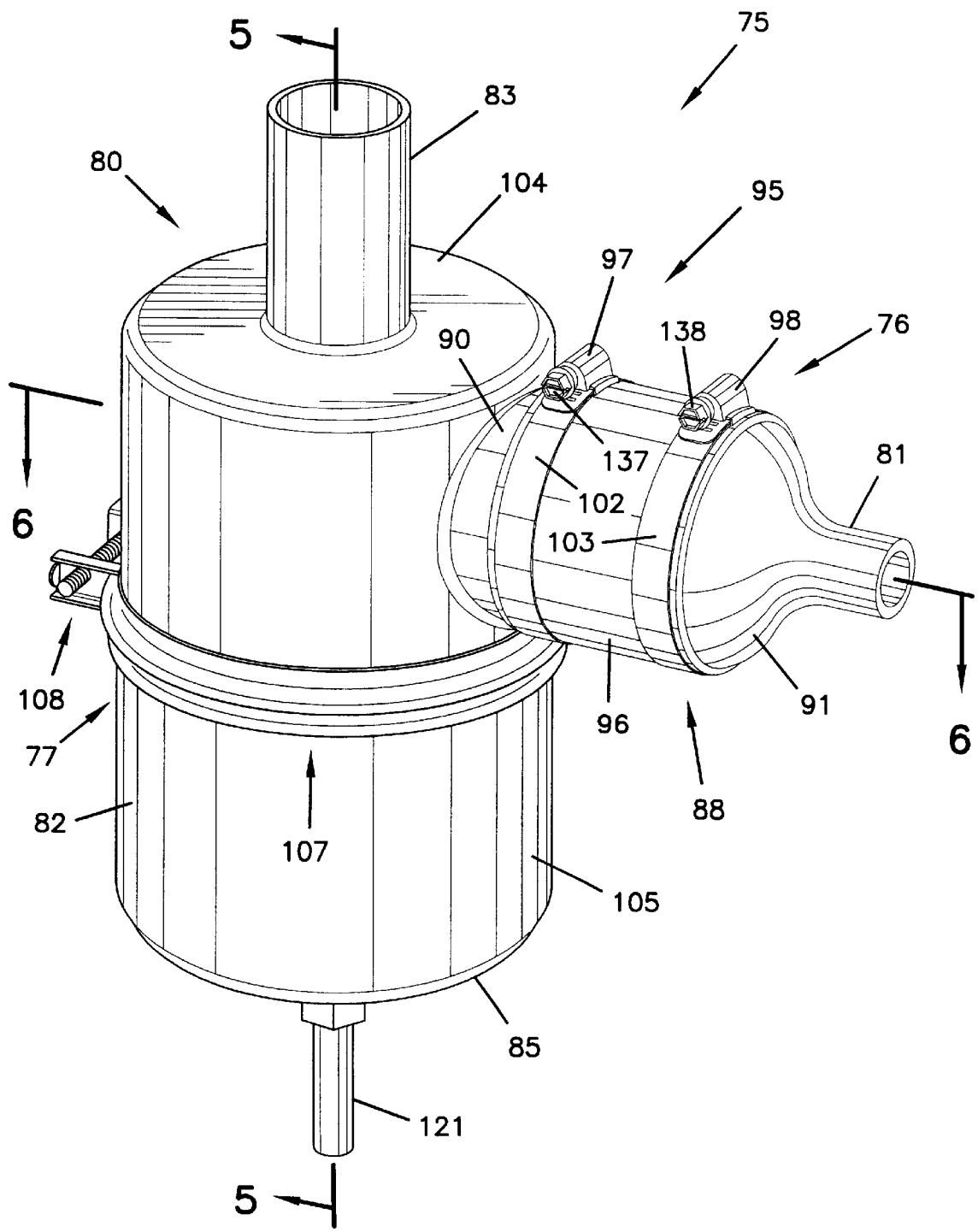
FIG. 3 is a perspective view of an arrangement according to the present invention.

In FIG. 3, a perspective view of a dual-stage aerosol separator assembly 75 is provided. In general, the first stage of separation, which includes a coalescer filter, is indicated generally at 76; and, the second stage, which comprises a polishing filter, is located within the portion of the assembly indicated generally at 77.

Referring to FIG. 3, the assembly 75 includes a housing 80 having an inlet tube construction 81; a canister portion 82; and, an outlet tube construction 83. In use, gas flow to be modified is directed into the canister portion 82 via inlet tube construction 81. Liquid which coalesces within the first stage 76 drains to a bottom portion 85 of the canister portion 82, from which it is removed as described below. The gas phase is directed through canister portion 82, and a filter element positioned therein, and is directed outwardly from the assembly 78 through outlet tube construction 83.

Figure 8:
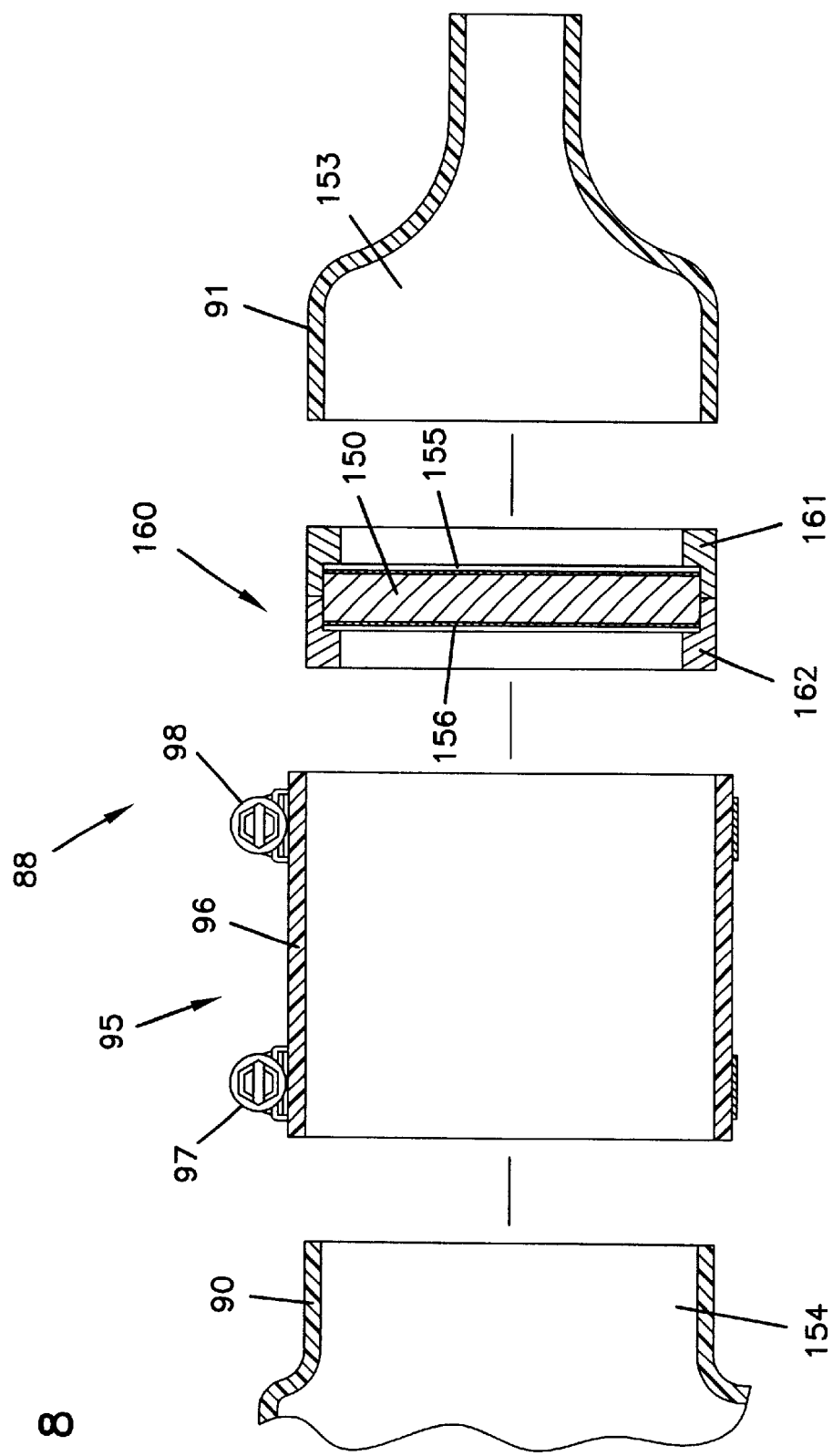
FIG. 8 is a fragmentary, exploded cross-sectional view of a portion of the arrangement shown in FIG. 6.

For the assembly 75 shown, the inlet tube construction 81 comprises a segmented tube construction 88 (FIG. 8). The term "segmented tube construction" and variants thereof used herein, refers to a tube which comprises at least two separable segments mechanically secured together. That is, the segments can be readily separated from one another. In the instance of segmented tube construction 88, two segments are shown comprising a first segment 90 and a second segment 91. Segment 91 is completely separable from a remainder of the assembly 75, whereas segment 90 is integrally formed with a portion of the housing 80. In the arrangement shown, the first stage coalescer separator or filter is positioned between first segment 90 and second segment 91. Second segment 91 is secured, in fluid flow relation, to first segment 90, by clamp arrangement 95. Clamp arrangement 95 comprises oversleeve 96, secured to join, in a sealing manner, segments 90 and 91, by clamps 97 and 98. Clamps 97, 98 include bands 102, 103 mounted around oversleeve 96 and secured with fasteners 137, 138. Thus, second segment 90 can be removed and replaced by simply loosening clamp 98.

Still referring to FIG. 3, housing 80 comprises a first or cover section 104 and a second or bottom section 105. The two sections are joined to one another along seam 107 by clamp 108. For the arrangement shown, sections 104 and 105 can be separated from one another, selectively, by simply loosening or releasing the clamp 108. This allows access to the interior of housing 80, for servicing.

Still referring to FIG. 3, for the particular arrangement shown, cover section 104 is a molded plastic construction 109; and, bottom section 105 is a sheet metal section 110. Although alternate arrangements are possible, advantages from constructing the two sections 104 and 105 as described will be apparent from following descriptions.

In use, assembly 75 can be readily mounted to the framework of a vehicle or other equipment. A variety of mounting arrangements can be used, including mounting band arrangements or a framework with appropriate retention nuts. In some instances molded mounting arrangements may be constructed to extend around the outer periphery of cover section 104, to allow for greater choice of radial positioning, during mounting.

Before detailed description of internal components of assembly 75 is presented, a review of certain other Figs. will be made in order to examine outwardly viewable features of the assembly 75.

Figure 4:
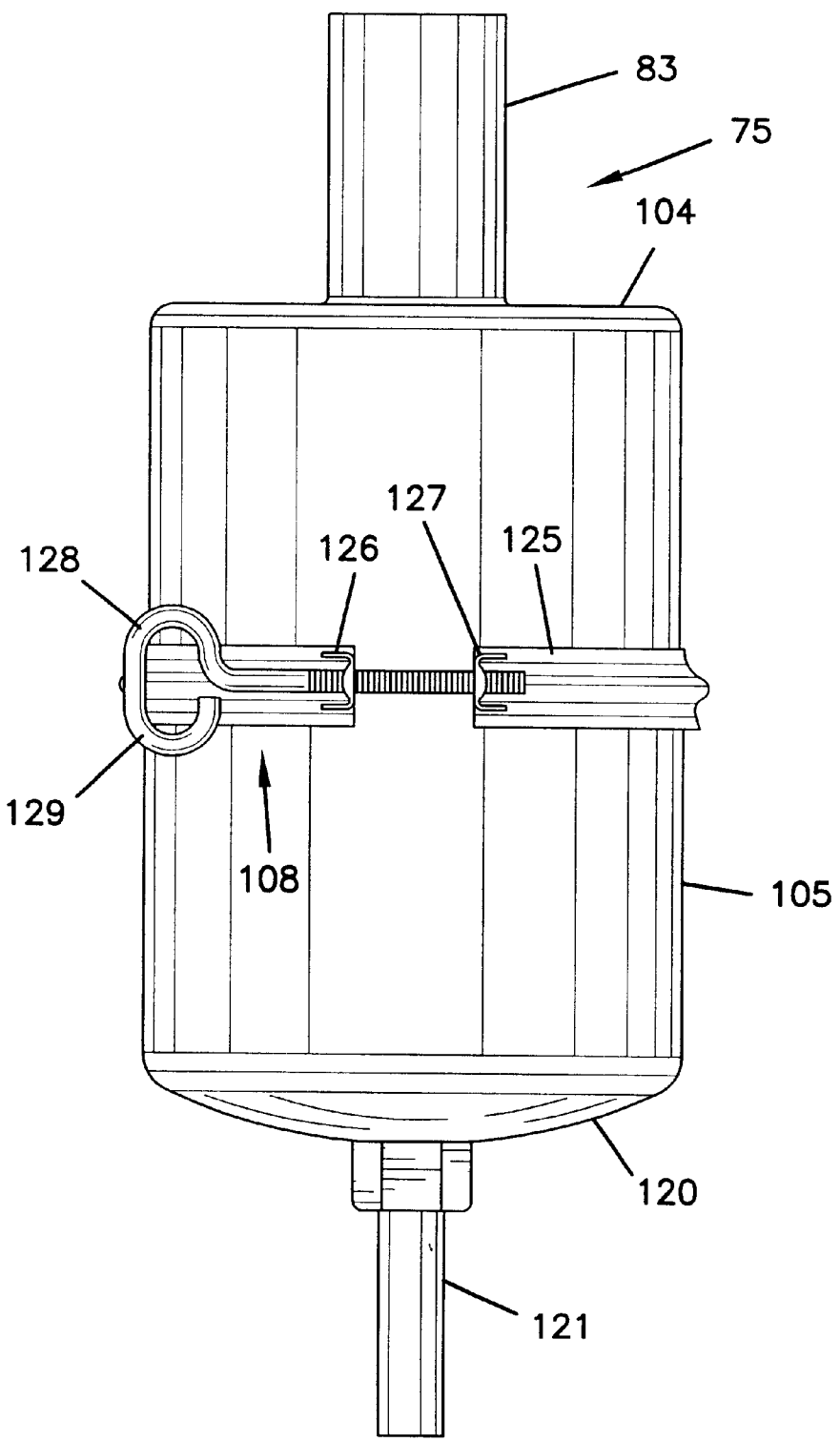
FIG. 4 is a side elevational view of the arrangement shown in FIG. 3.

Referring first to FIG. 4, it is noted that second or bottom section 105 has a bowl or funnel-shaped lower end or end cover 120 with centrally positioned liquid drain 121 therein. The combination of bowl 120 and drain 121 comprises a collection and drain arrangement for hydrophobic liquid. In use, as liquid coalesces within the assembly 75, it will drain downwardly toward end plate or bowl 120, and will be funneled to drain 121. Typically, appropriate drain lines will be secured to drain 121, to direct the collected liquid as desired, for example to an oil sump.

Also referring to FIG. 4, further detail concerning clamp 108 is viewable. The clamp 108 includes a metal band 125 having opposite end brackets 126 and 127 thereon. Turn key 128 includes handle 129 which can be turned, to tighten band 125 by pulling ends 126 and 127 together. By so doing, due to the configuration of band 125 and certain components positioned thereon, discussed hereinbelow, housing sections 104 and 105 can be sealed together.

Figure 12:
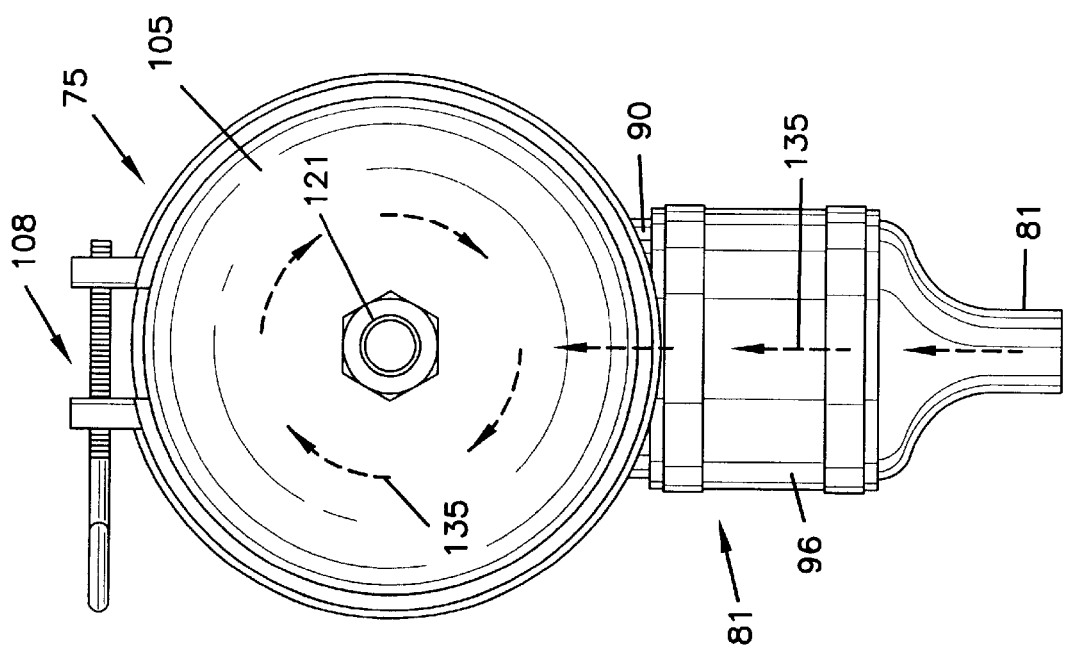
FIG. 12 is a bottom plan view of the arrangement shown in FIG. 3.
Figure 11:
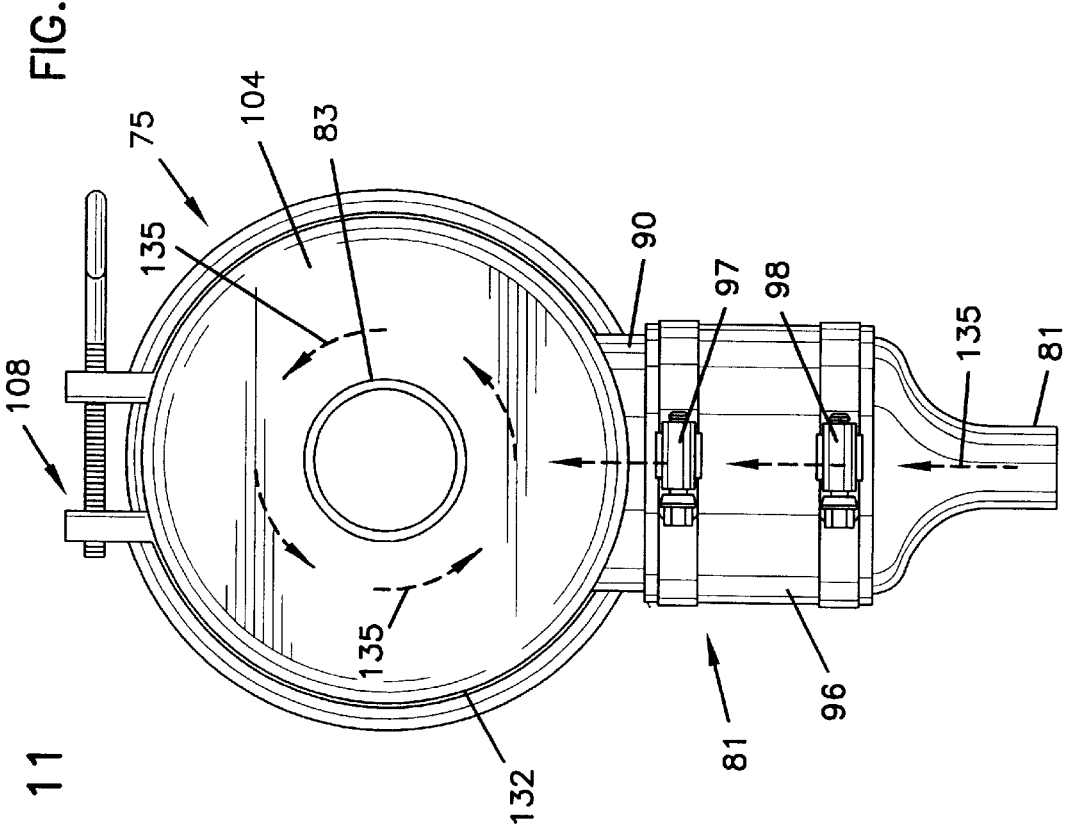
FIG. 11 is a top plan view of the arrangement shown in FIG. 3.
Figure 13:
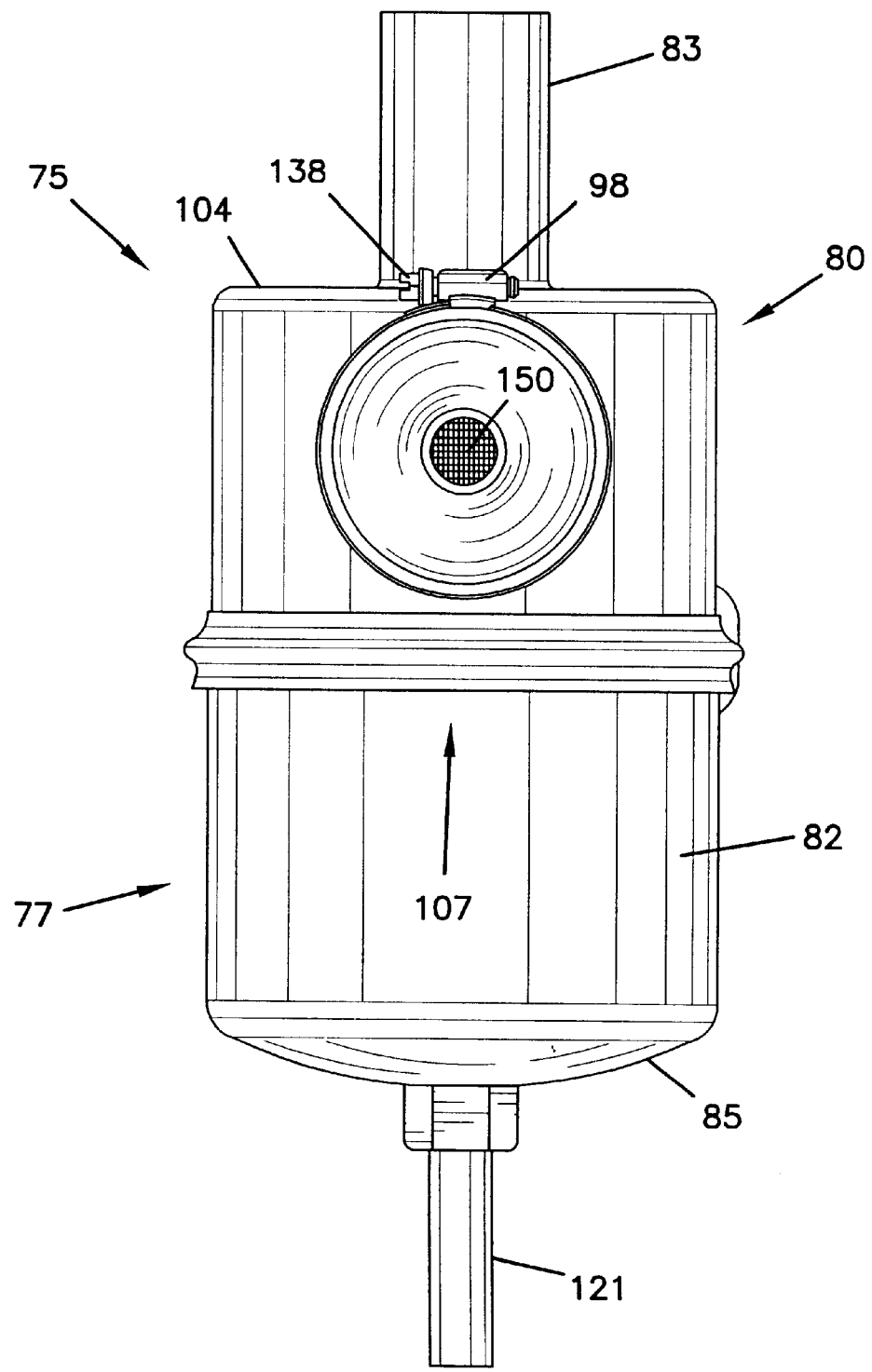
FIG. 13 is a side elevational view of the arrangement shown in FIG. 3, the view of FIG. 13 being from a side opposite to that shown in FIG. 4.
Figure 14:
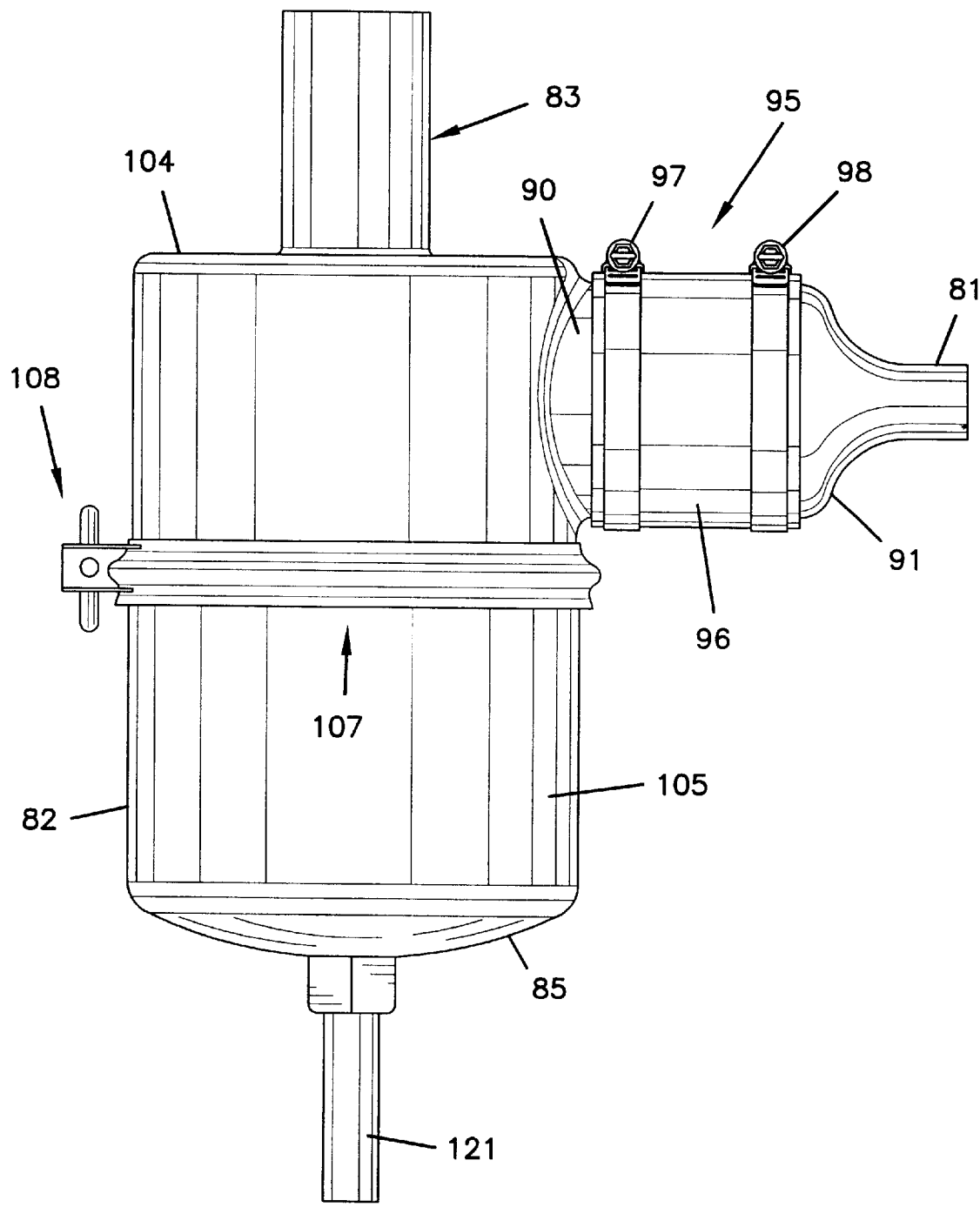
FIG. 14 is a side elevational view of the arrangement shown in FIG. 3, the view of FIG. 14 being analogous to the view of FIG. 13 with the device of FIG. 13 rotated 90° counterclockwise.
Figure 15:
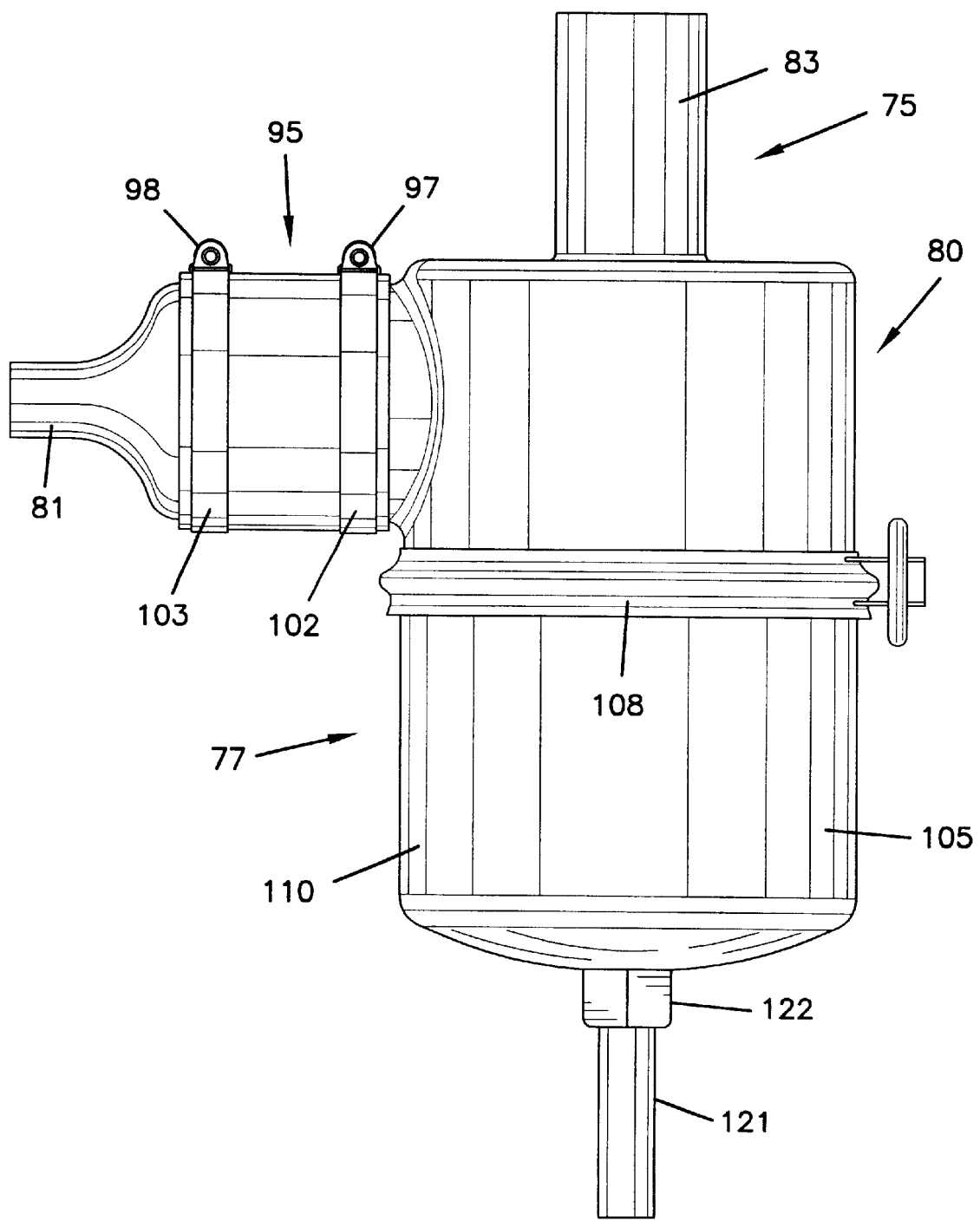
FIG. 15 is a view of the arrangement shown in FIGS. 13 and 14, with the view being a side elevational view depicting the device rotated clockwise 90°, relative to the viewing angle shown in FIG. 13.

Attention is now directed to FIGS. 11 and 12. FIG. 11 is a top plan view of the arrangement shown in FIG. 3; and, FIG. 12 is a bottom plan view of the arrangement.

Referring to FIGS. 11 and 12, it is noted that the inlet tube construction 81 is mounted at the center of the housing 75. Housing cover section 104 has a generally circular outer wall 132. The circular outer wall defines a circular inner wall 133, FIG. 6. In general, inlet tube construction 81 directs air passing therethrough, in the general direction indicated by phantom arrows 135, FIG. 11.

In an alternative construction, the inlet tube may be mounted with a sidewall thereof generally tangential to a circular inside wall of the housing, rather than directly toward a center point or axis. A tangential mount of the inlet tube relative to the housing will create a tangential airflow path around the element.

Figure 6:
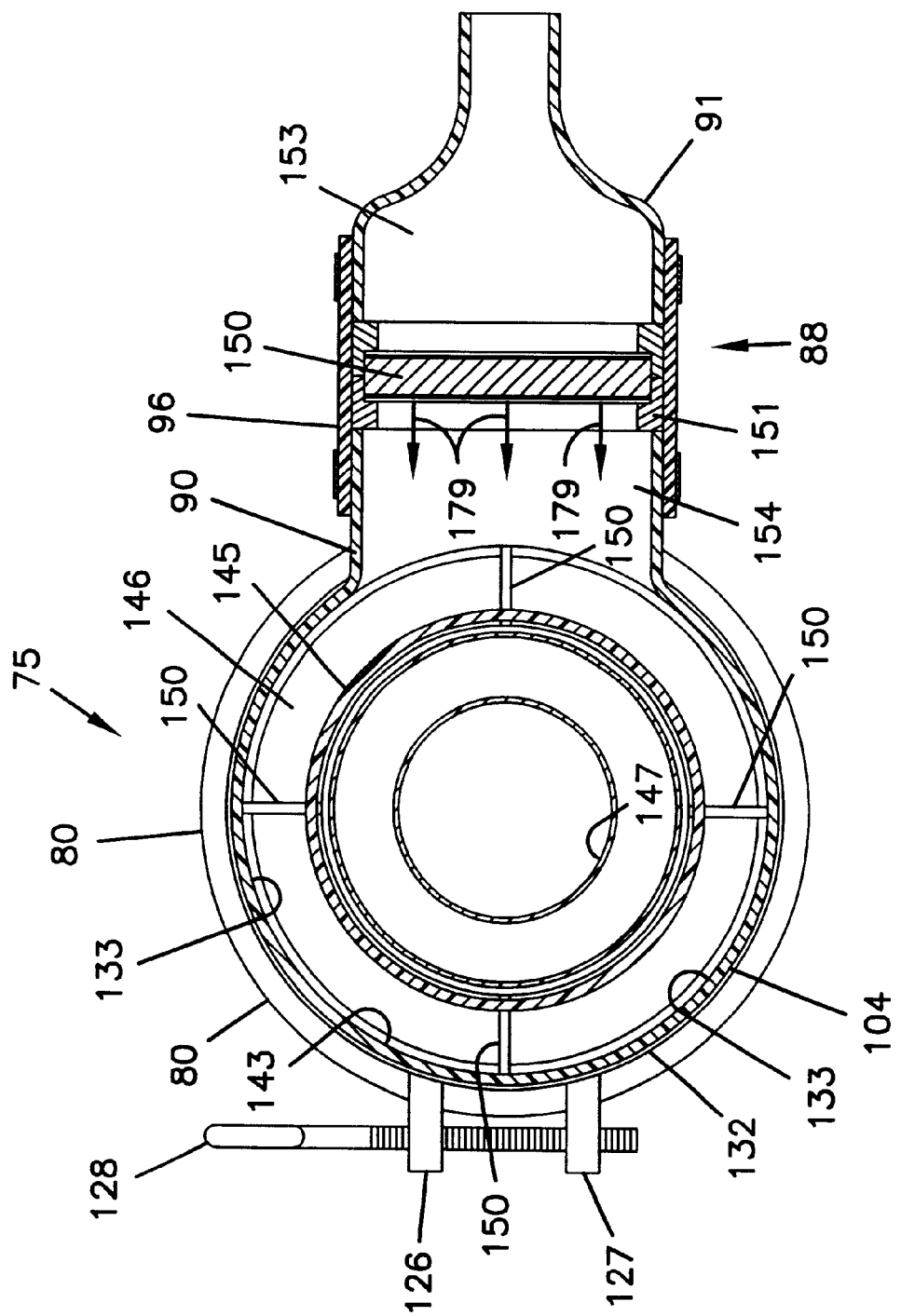
FIG. 6 is a cross-sectional view taken generally along line 6—6, FIG. 3.

Attention is now directed to FIG. 6. FIG. 6 is a cross-sectional view taken generally along line 6—6, FIG. 3. As a result of the orientation of view in FIG. 6 one views the interior construction of cover section 104 and segmented tube construction 88.

Referring to FIG. 6, cover section 104 includes therein circular baffle member 145. Baffle member 145 is positioned spaced from outer wall 133, generating cyclonic air flow passageway 146 therebetween. Outlet tube 83 includes an extension 147 concentricity aligned with baffle member 145, and circumscribed thereby. As will be understood from descriptions hereinbelow, between section 147 and baffle member 145, an end of a filter element (described in connection with FIG. 5) will typically be positioned in use. Typically baffle member 145 will be a length of about 75%–125%, more typically about 110%, of the diameter of the inlet.

Still referring to FIG. 6, structures 150 comprise vanes in bottom section 105, discussed below.

Still referring to FIG. 6, for the particular arrangement shown, sandwiched between second section 91 and first section 90 of segmented tube construction 88 includes coalescer filter 150 therein. Coalescer filter 150 is secured within framework 151 tangentially across gas flow passageway 152. Thus, gas that is passing from region 153 of tube 90 into region 154, of tube 91, generally passes through coalescer filter 150. Of course coalescer filter 150 could be positioned in other parts of the assembly 75; for example in tube section 91 or in cover 104. However, the arrangement shown is convenient and effective.

Coalescer filter 150 comprises a material appropriate for coalescing hydrophobic aerosol carried within a gas stream passing through tube 91 into housing 80. Preferred materials for coalescer filter 150 will be described below. It is foreseen that in typical embodiments coalescer filter 150 will comprise a nonwoven fibrous bundle.

Attention is now directed to FIG. 8. At 160 is a removable and replaceable segment 160. Segment 160 includes appropriate framework 161, 162 to receive, securely, coalescer filter 150 therein and to position coalescer filter 150 in securing relation between first section 90 and second section 91. Coalescer filter 150 is preferably sealed within the framework 161, 162. The sealing may be accomplished by gluing, crimping, heatstaking, ultrasonic welding, or by other methods and materials. Preferred constructions are as described below.

It is noted that for the arrangement shown in FIG. 8, flow passageway 153 is of about an equal cross-sectional diameter to the cross-sectional diameter of region 154. In general, it is desirable to maintain a face velocity of about 200–500 ft/min, preferably, about 350 ft/min across coalescer 150.

Figure 9:
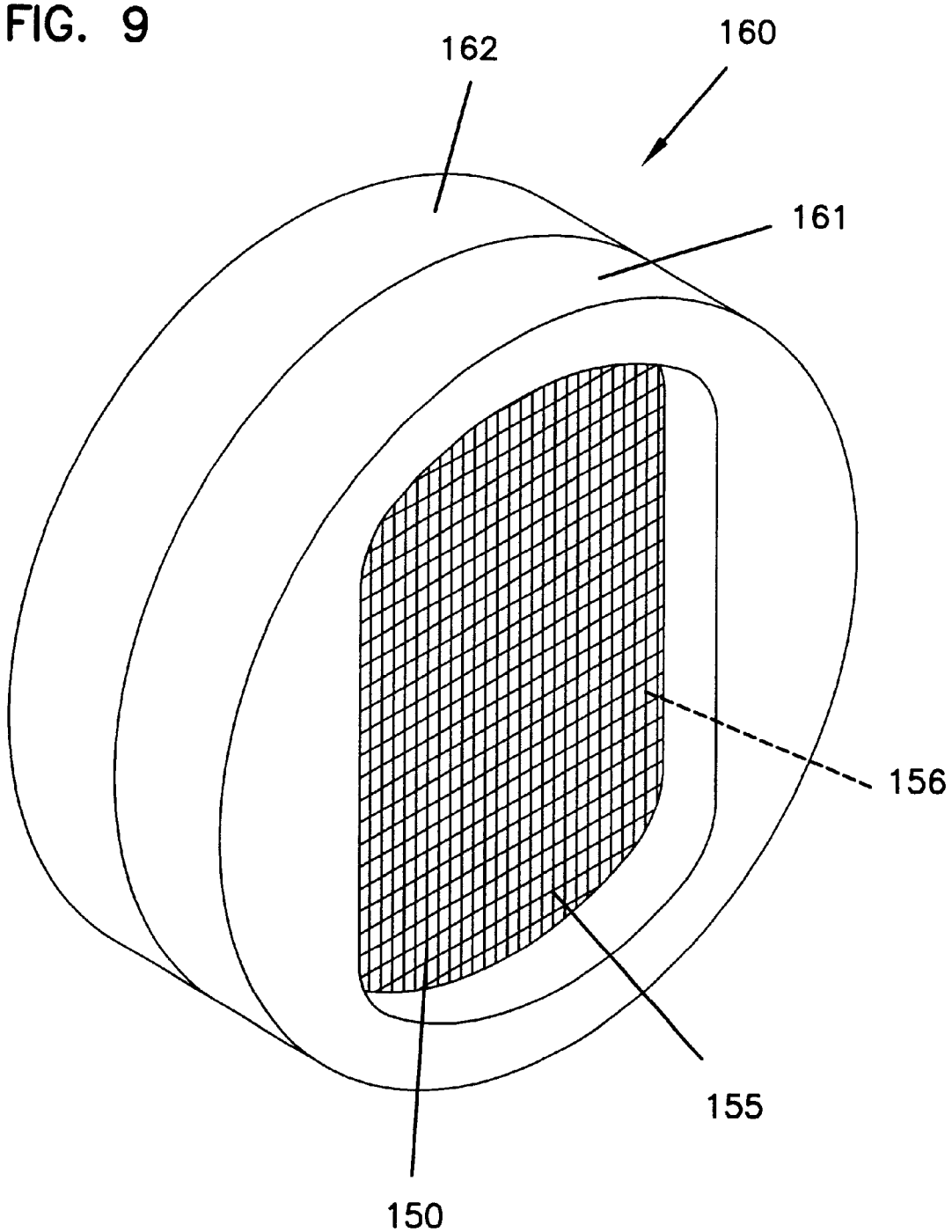
FIG. 9 is an enlarged perspective view of a coalescer filter depicted in FIG. 8.

Attention is now directed to FIG. 9 in which an enlarged perspective view of coalescer filter 150 within its framework 161, 162 is depicted. Referring to FIG. 9, the coalescer segment 160 is generally cylindrically shaped. It includes an upstream face 155, and a downstream face 156 at an opposite side thereon.

Referring to FIG. 6, in use, as gas flow is directed through coalescer filter 150 from region 153 toward region 154 (and housing 80), hydrophobic liquid carried or entrained within the gas flow, as an aerosol, will coalesce within the filter 150. As the liquid droplets form, they will drain from filter 150 and, due to the gas flow, will generally flow outwardly from filter 150 in the direction indicated by arrows 179. The gas flow will generally cause the liquid flow to enter the housing 80 and to drain downwardly along inward wall 133 toward an interior of bottom cover 105. Eventually the liquid will drain to the bottom of cover 105, along end plate 120 toward drain 121, FIG. 4. This liquid flow will include therein some particulate material, for example, carbon particles, trapped within a liquid in coalescer 150. Thus the liquid flow will, to some extent, self-clean filter 150.

The gas flow, on the other hand, will enter housing 80 in a cyclonic pattern, between baffle 145 and inner wall 133. This gas flow is then directed to a second stage filter, described below in connection with FIGS. 5 and 7.

Figure 5:
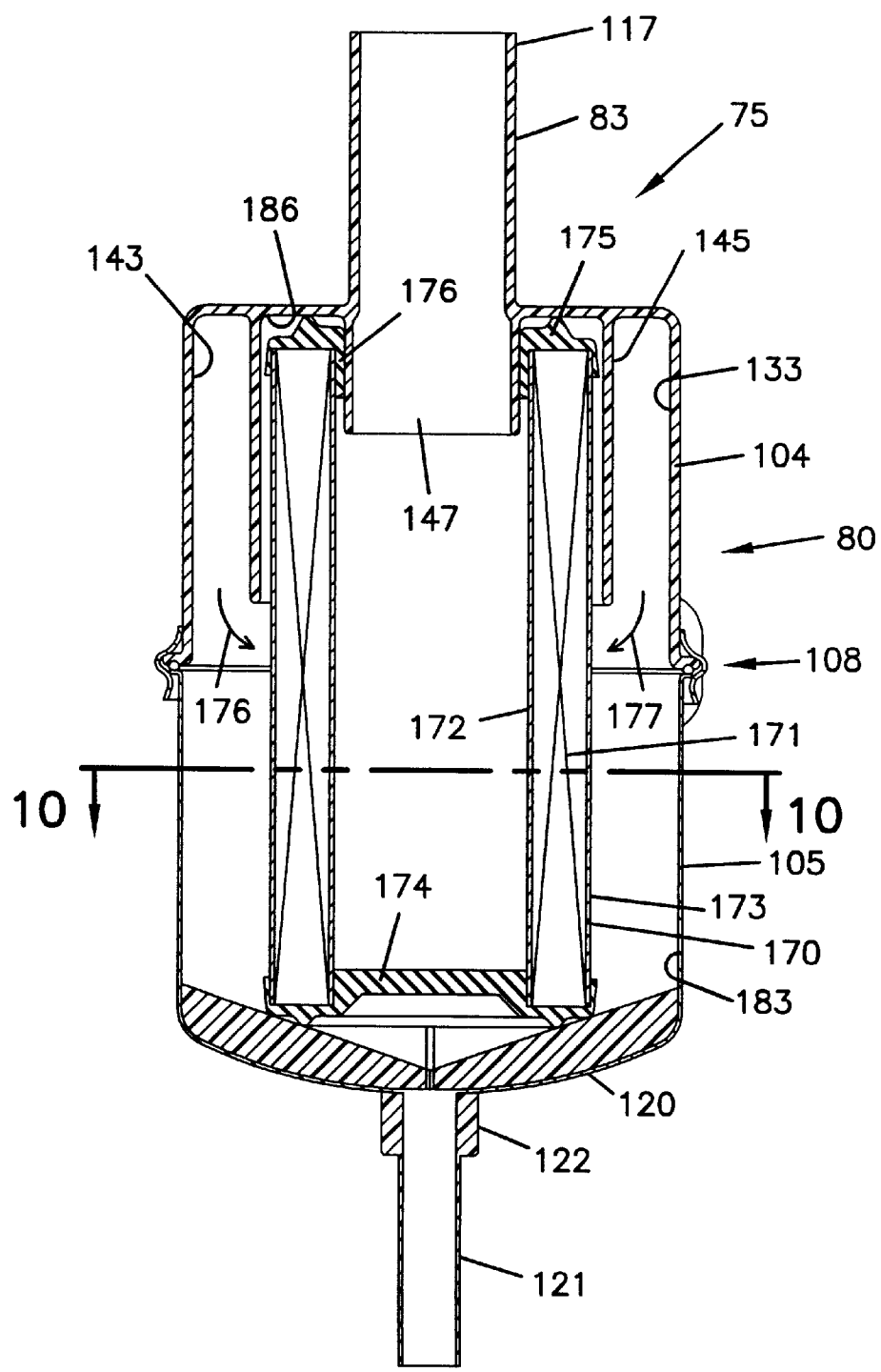
FIG. 5 is a cross-sectional view taken generally along line 5—5, FIG. 3, and viewed from a reverse direction to that shown in FIG. 4.

Referring to FIG. 5, assembly 75 is shown in cross-section. It can be seen from FIG. 5 that assembly 75 includes a downstream or second stage filter element 170 positioned therein. Preferably element 170 is removable and replaceable. Element 170 generally comprises filter media 171 positioned between inner and outer liners 172 and 173. A preferred construction, and materials, are described below. Element 170 includes a closed end cap 174 and an open end cap 175. Open end cap 175 includes a radial sealing portion 176 sized and configured to sealingly engage tube section 147, in a radially sealing manner therealong. As a result, material in region 176 becomes compressed between tube 147 and other portions of element 171, to form the radial seal.

In use, after gas flow enters cyclonic section 143, it passes downwardly in the general direction indicated by arrows 176, 177 through filter element 170, and outwardly through outlet tube 83. Filter element 170 generally operates as a polishing filter to remove such materials as some aerosol that may get past the coalescer, smoke, and hydrocarbons, from the gas flow stream.

Coalesced liquid flow, from the coalescer 150, again, will generally run downwardly along inner wall 133 into section 105, and downwardly along wall surface 183, toward drain 121. Thus, this liquid will generally not be directed into filter element 170.

Figure 10:
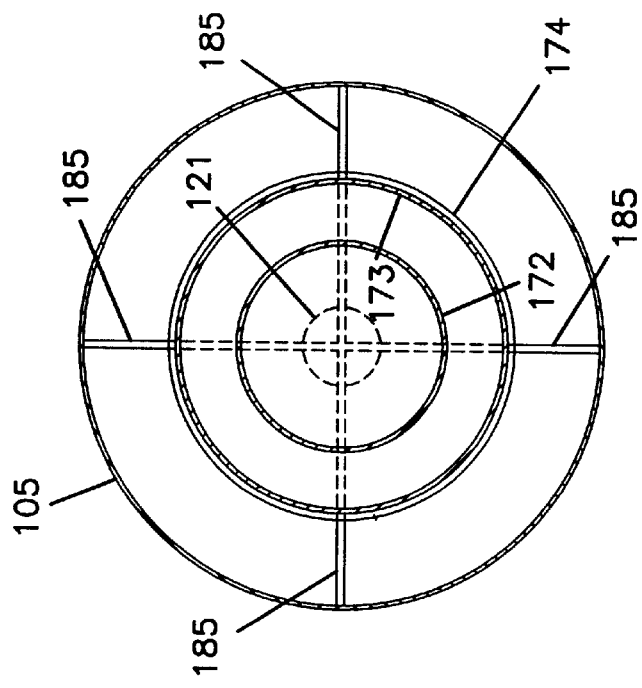
FIG. 10 is a cross-sectional view taken generally along line 10—10, FIG. 7.

Attention is now directed to FIG. 10. FIG. 10 is a cross-sectional view taken generally along line 10—10, FIG. 5. From comparison of FIGS. 5 and 10, one can understand that section 105 includes bottom vanes 185 therein. For the arrangement shown, a plurality (four) vanes 185 are depicted. The vanes 185 meet over drain 121 and provide a reinforcing structure in bottom 120 to lightly support filter element 170 in compression against surface 186 and above liquid (which may pool on top of end cover 120, during use). In general, vanes 185 separate the filter element 170 from the oil being collected. The vanes 185 also help to force the element 170 into position in the housing and maintain the seal 176 in place. Vanes 185 also help to ensure that the element 170 does not fall out of the housing during use due to vibration. In the illustrated embodiment, vanes 185 are molded separately as a separate piece from the housing, and then connected to the housing by an appropriate fastener 122.

Figure 7:
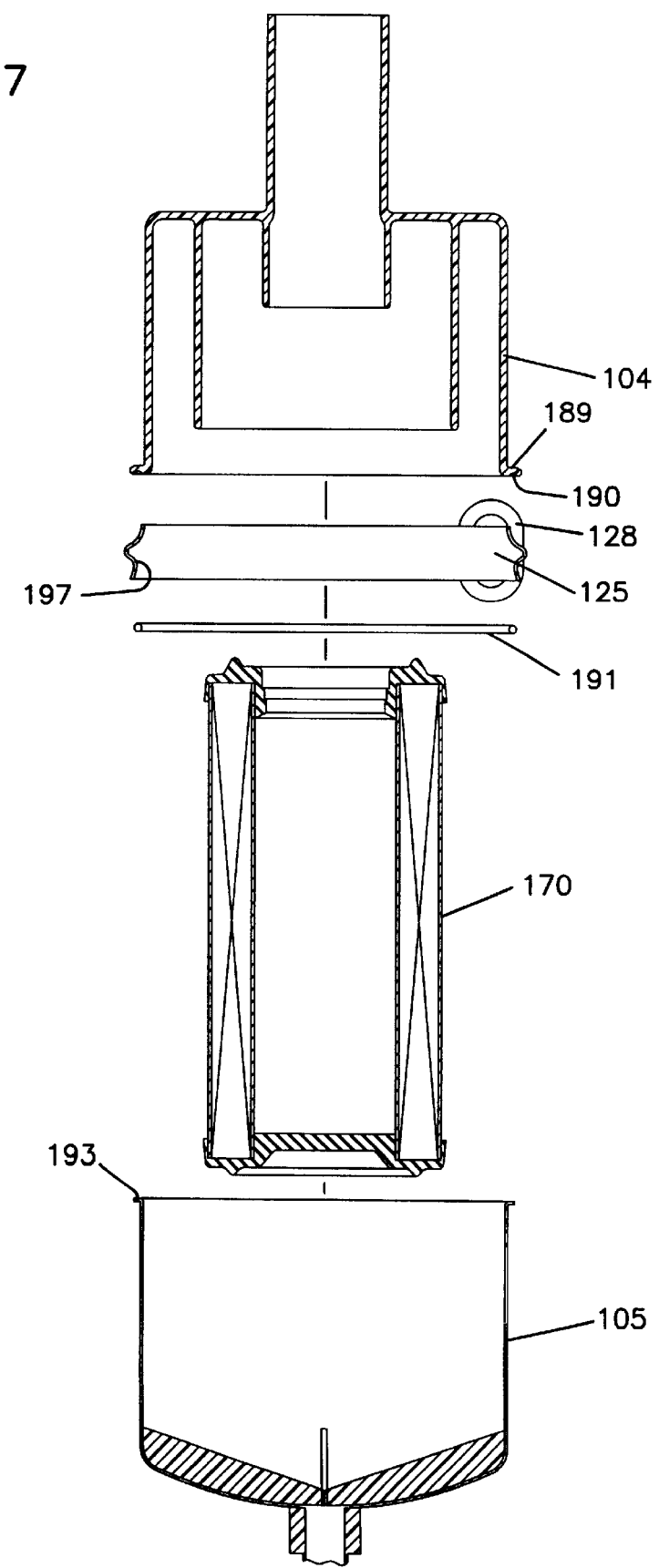
FIG. 7 is an exploded cross-sectional view of the arrangement shown in FIG. 5.
Figure 16:
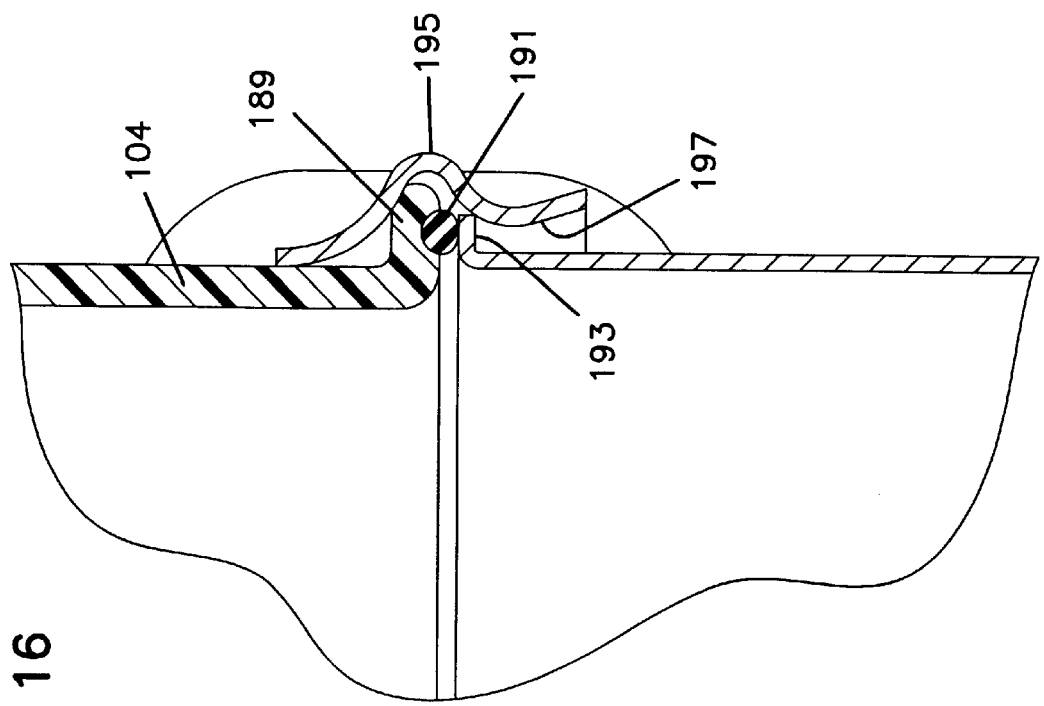
FIG. 16 is an enlarged, fragmented, cross-sectional view of a seam joining the first and second sections, shown in FIG. 5.

Attention is now directed to FIGS. 7 and 16. Cover 104 includes bottom flange 189 with gasket recess 190 therein. Gasket recess 190 is sized and configured to receive, partially set therein, o-ring 191. Section 105 includes mating flange 193. When the arrangement is assembled, flange 193 is compressed toward flange 189, with o-ring 191 positioned therebetween. The shape of inner surface 197 of band 195 is configured so that as key 128 is tightened, band 195 compresses flanges 189 and 193 together, around o-ring 191, to cause a good seal. To facilitate this, inner surface 197 is a generally shaped like a wave or omega. FIG. 16 shows the flanges 189, 193 clamped together by band 195.

For the particular preferred arrangement shown, it is noted that the upstream surface area of coalescer filter 150 is substantially smaller than an upstream surface area of second stage filter element 170. Especially if a fluted media is used for media 171, this difference may be substantial. It is foreseen that using the preferred materials described herein, a system in which the coalescer filter 150 has an upstream surface of about 1–20%, and no more than 25%, of the downstream area of the media 171 will be effective.

Herein the term "gas flow direction arrangement" or variants thereof will sometimes be used to refer to the portions of arrangements which direct gas flow. For arrangement 75, FIGS. 3–15, this would include the inlet tube, walls, baffles and outlet tube. The "gas flow direction arrangement" generally operates to ensure proper gas flow, through the filters, in proper order.

Constructions according to the present invention can be made rather small, yet be highly efficient. Materials and dimensions to accomplish this, for a variety of systems, are described below.

III. Some Useful Materials

A. Coalescer Media

Significant advantage may be obtained by choice of certain preferred material for the coalescer media. Preferred materials comprise nonwoven fibrous constructions of fibers of appropriate size, and with appropriate solidity or density, to operate as a good coalescer for the types of air streams likely to be encountered in use. Preferably organic fibers, such as polyester fibers, of a denier of about 1.5 or a diameter of about 9–25 micron, typically about 14.5 microns, are used to form the material. A preferred material is 8643 available from Kem-Wove, Inc., Charlotte, N.C. 28241.

The density or percent solidity of the media may be varied, depending on a particular use. In general, the percent solidity, free state, is about 1.5–1.8.

B. Downstream Filter Media

For the downstream filter, conventional media used in such arrangements as diesel engines will be acceptable for typical systems. A preferred such media is high surface loading pleated paper. One typical media is a high surface loading pleated paper having a weight of about 118+/−8 lbs./3,000 square feet; a permeability of about 34+/−5.5 feet per minute; a thickness at 1.25 psi of about 0.05–0.07 inches; a tensile strenght of at least 13 pounds per inch; a wet burst strengh of at least 12 psi; and a cured wet burst strength of no greater than 40 psi. Media such as this used in an arrangement as described herein achieves an efficiency of at least 80%, by weight.

C. Other Components

Preferably, the cover section of the housing is constructed from plastic, for example, a glass-filled nylon. The bottom section is sheet metal. Alternatively the entire housing could be constructed from all metal or all plastic.

Preferably, the end caps are made from a polyurethane foam. Alternatively, the end caps could be metal.

IV. Principles Relating to Size of System

It is particularly advantageous that an arrangement utilizing principals described herein can be configured in a relatively small package, with highly efficient operation. For example, it is foreseen that a system such as that shown in the Figs. can be configured with an overall size of about 5 inches in diameter and about 12 inches in length, with an overall operation efficiency of greater than 90% for gas flow streams such as diesel blow-by combustion aerosol.

A key component in such systems, of course, is the coalescer. In particular, the coalescer is configured to have an upstream surface area of no more than about 20%, typically no more than about 10%, (usually 0.5 to 1%) of the surface area of the downstream filtering media. An example of one usable coalescer filter has an upstream surface area of about 3.75 square inches. The overall volume is about 1.875 cubic inches, with a length of about 2.5 inches, a width of 1.5 inches, and a thickness of 0.5 inches. The flow rate is typically 5–10 cfm, and the flow velocity typically about 3.2–6.4 feet per second. Media, such as polyester fibers of a denier of about 1.5 and a diameter of about 14.5 microns used in a system such as that described herein, achieves an efficiency of aerosol removal of at least 25%, by weight.

The downstream filter media, such as that illustrated at 171, may be configured to have a diameter of about 3.5 inches, and a length of about 7 inches. The inner diameter, that is the diameter of the aperture for receiving the outlet tube construction, is about 2 inches. The overall cylinder area is about 76 square inches, and the surface area is about 390 square inches. A typical flow rate is about 5–10 cfm, and a typical flow velocity is about 0.03–0.06 feet per second.

V. An Additional Embodiment

Attention is now directed to the additional embodiment depicted in FIGS. 17–30.

Figure 17:
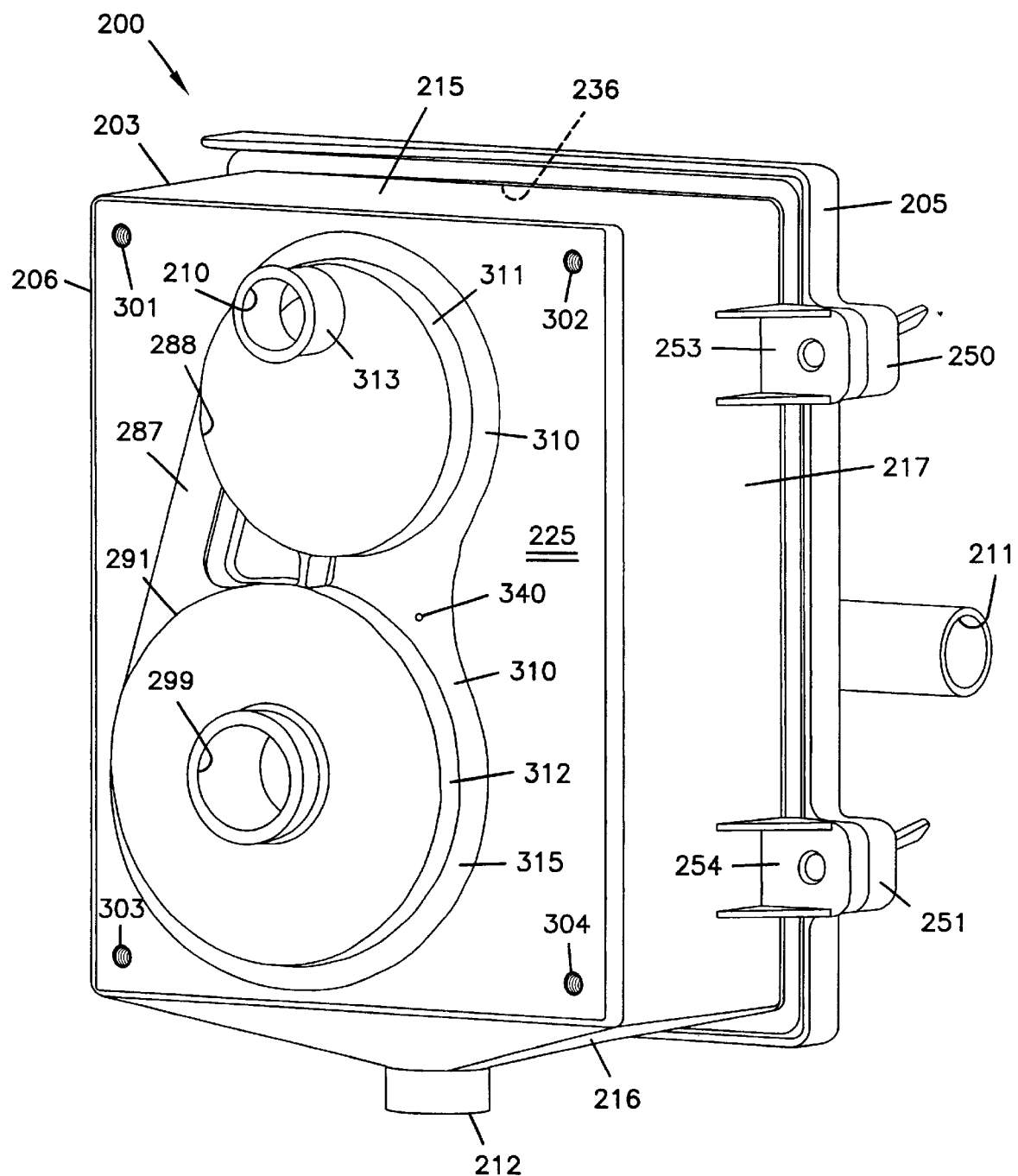
FIG. 17 is a perspective view of a second embodiment of a coalescer filter, according to the present invention.

Referring to FIG. 17, a coalescer filter construction is depicted at reference numeral 200. The coalescer filter construction 200 includes a housing 203. The housing 203 depicted is generally a rectangular box, which represents a convenient shape for certain uses, as characterized below. The depicted housing 203 has a two piece construction. More specifically, housing 203 comprises cover or door 205 mounted on body or shell section 206.

Figure 18:
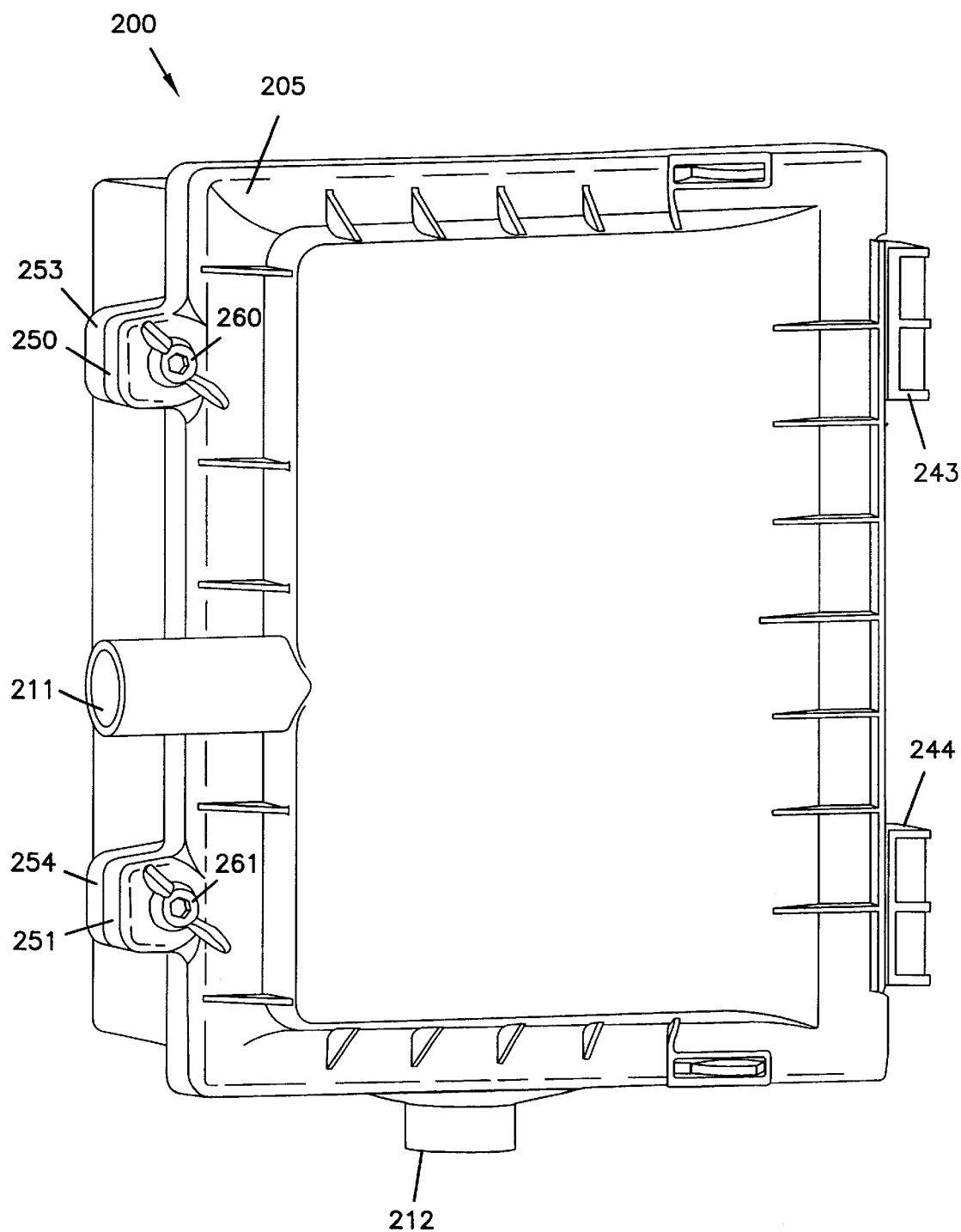
FIG. 18 is a perspective view of the arrangement of FIG. 17 depicting the opposite side, according to the present invention.

Referring to FIGS. 17 and 18, the housing 203 includes the following three flow ports: gas flow inlet port 210; gas flow outlet port 211; and, liquid flow outlet port or liquid drain 212. As a result, coalescer filter construction 200 is configured according to the general schematic of FIG. 2.

Figure 19:
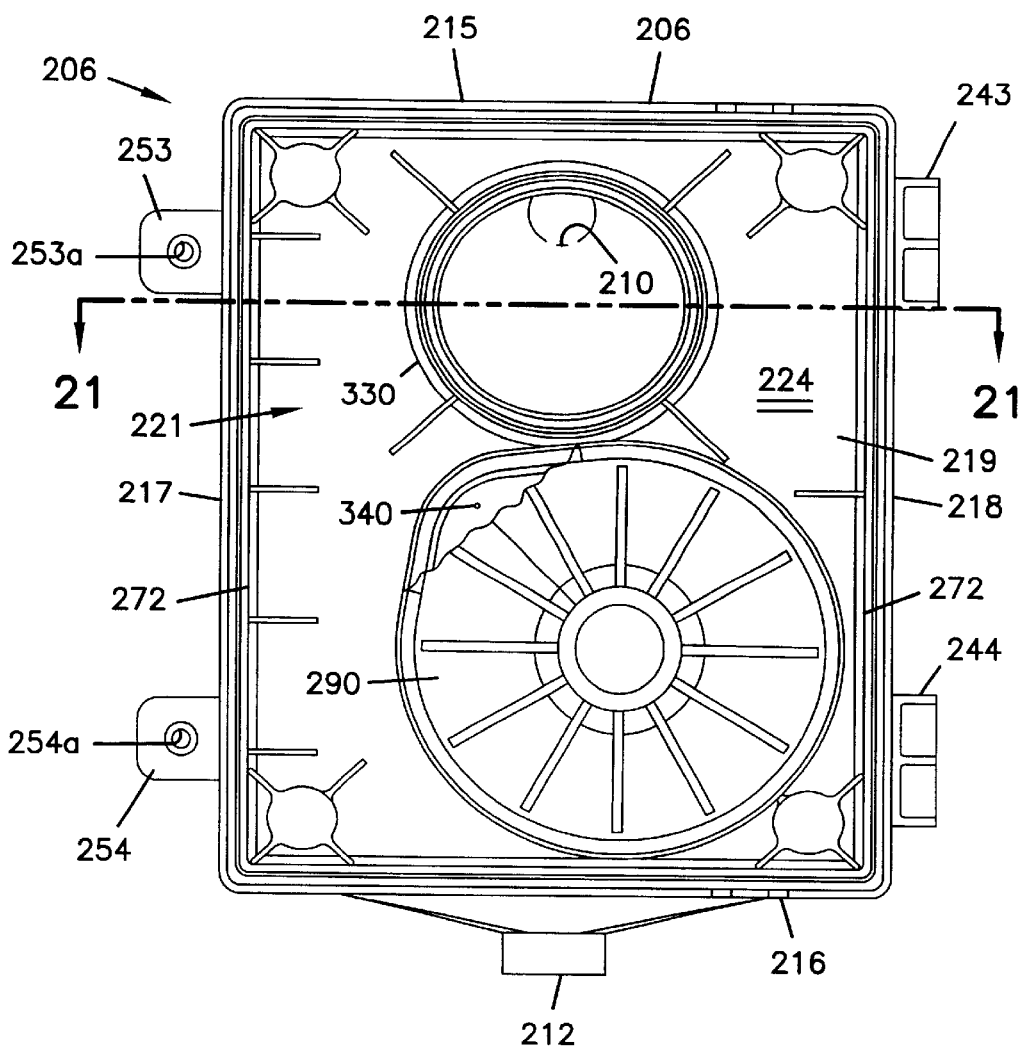
FIG. 19 is a top plan view of the arrangement of FIG. 18 showing a housing body and with the cover and the first and second stage filter media removed, according to the present invention.
Figure 21:
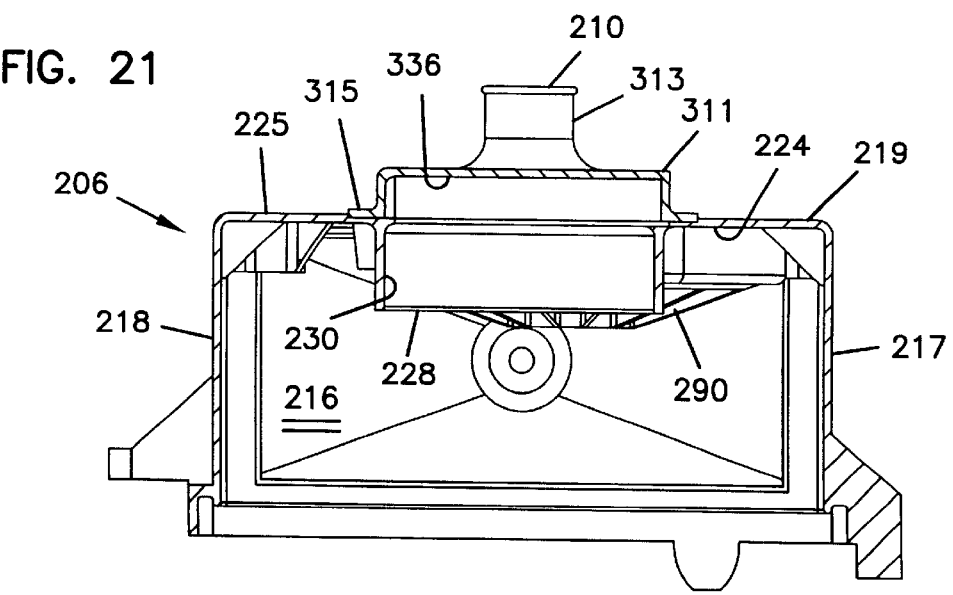
FIG. 21 is a cross-sectional, somewhat schematic, view taken along the line 21—21 of FIG. 19 of the body, according to the present invention.
Figure 20:
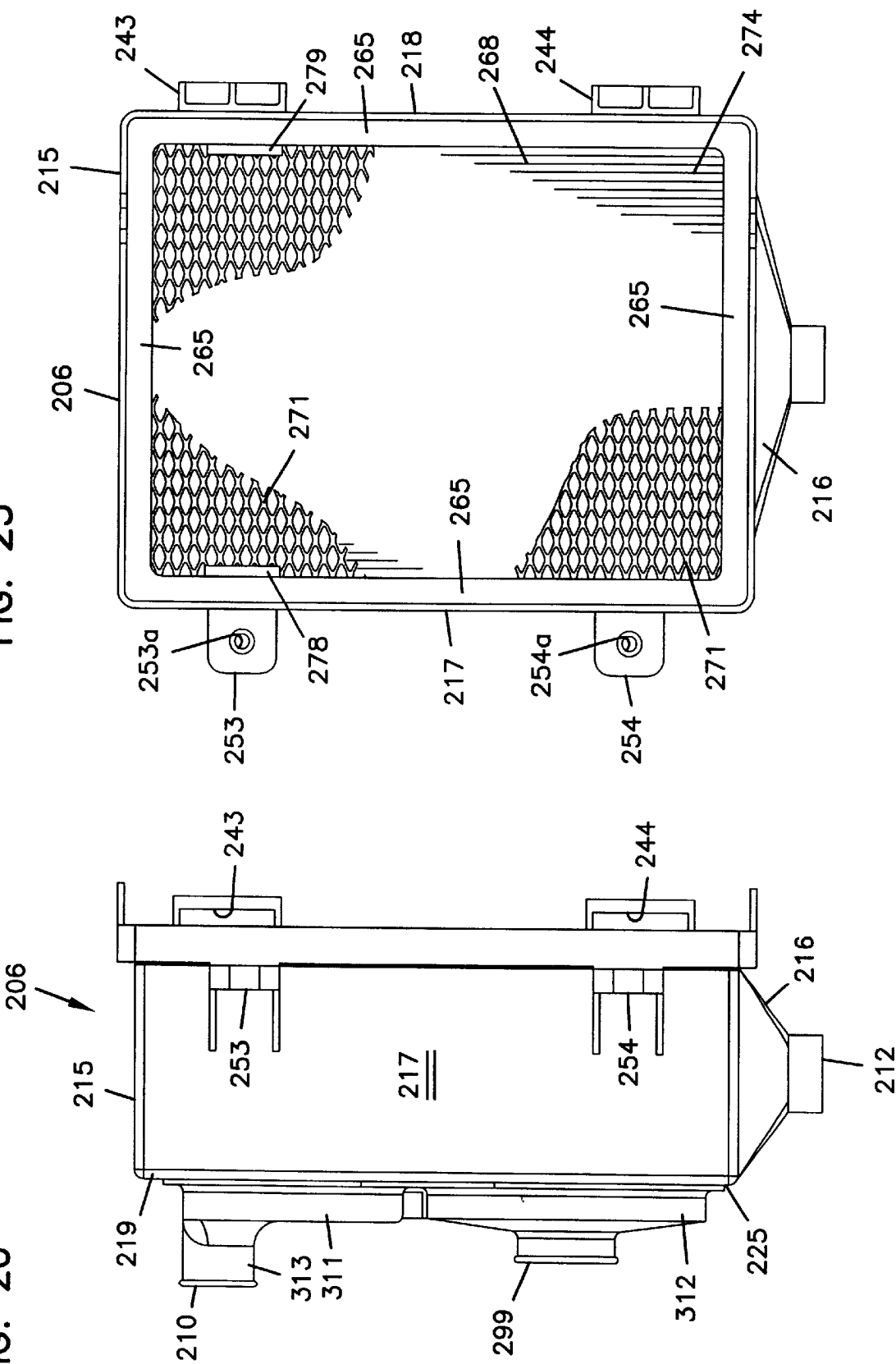
FIG. 20 is a side-elevational view of the housing body shown in FIG. 19, according to the present invention.

Attention is now directed to FIGS. 19–21. At FIGS. 19–21, the housing body 206 is depicted. The body 206 includes top wall 215 bottom wall 216, first sidewall 217, second sidewall 218 and backwall 219. Walls 215, 216, 217 and 218 extend around, and project from, a periphery of backwall 219, to form receptacle construction 221. In use, various filter arrangements described below are positioned within receptacle 221.

Attention is now directed to FIGS. 17 and 19–21. From these Figs. it can be seen that backwall 219 includes a front side 224, which forms an interior surface of receptacle 221; and, backside 225, which forms a rear, external, surface of receptacle 221.

Referring to FIGS. 17 and 19–21, the gas flow inlet port 210 is positioned to extend into backside 225 of backwall 219. More specifically, the gas flow inlet port 210 is directed into receiver 228 (FIG. 21).

Receiver 228 defines a volume 230 projecting outwardly from selected portions of backside 225 of backwall 219. The volume 230 is sized for receiving a coalescer filter 233 (FIG. 29) therein. Inlet port 210 is directed into volume 230, in order to direct gas flow entering inner coalescer filter construction 200 through coalescer filter 233, in a manner described below.

Figure 22:
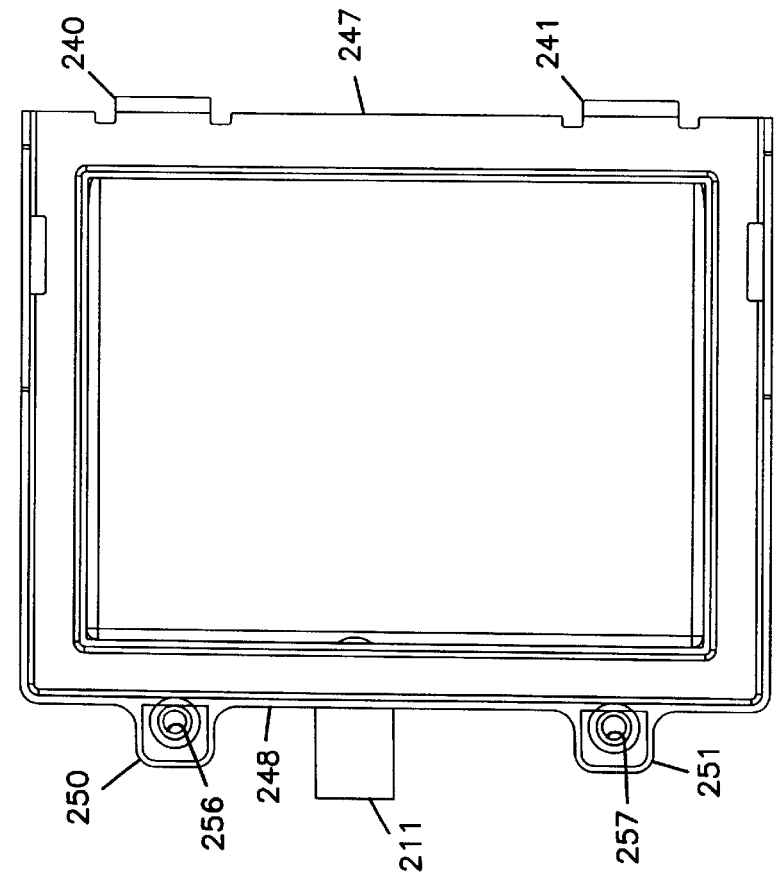
FIG. 22 is a top plan view of the cover depicted in FIG. 18, and showing an inside surface of the cover, according to the present invention.

In general, it is foreseen that pressures within interior 236 of coalescer filter construction 200 may, in use, be in the order of about under 1 psi, typically about ⅓ psi (about 10–15 inches of water). In addition, due to the nature and properties of the diesel blow-by gases, a mist of entrained oils results, which may have a tendency to try to seep from filter construction 200. Thus, a good, secure construction retaining door 205 on body 206 is used. Attention is directed to FIGS. 18 and 22 with respect to this.

Referring to FIG. 22, door 205 includes hinge tab 240 and 241 formed integrally thereon. The hinge tabs 240 and 241 are sized to be received within receivers 243 and 244 (FIG. 23) respectively, when door 205 is mounted on body 206. Receivers 243 and 244 allow tabs 240 and 241 respectively to pivot, as door 205 is swung between an open and closed position. When door 205 is in a closed position of FIGS. 17 and 18, receivers 243 and 244 secure hinge tabs 240 and 241 snugly, so that along edge 247 (FIG. 22) the door 205 cannot readily separate from body 206 even under internal pressures of the blow-by gases on the order of 0.5 to 1.0 psi. The internal pressure of the blow-by gases results in rather substantial forces on the door 205, in the order of about 10–40 psi, often about 35 psi (about 3,700 Pa.).

Door 205 includes an opposite side edge 248, from edge 247. Along this edge, door 205 includes retaining tabs 250 and 251 aligned with retaining tabs 253 and 254, respectively in body 206. Retaining tabs 250 and 251 include apertures 256 and 257 respectively therein, overlying analogous apertures 253a and 254a, and tabs 253 and 254 respectively. Preferably apertures include threaded metal inserts, to prevent wear and stripping of the threads. To secure door 205 closed, coalescer filter construction 200 includes thumb bolt 260 and 261 (FIG. 18) extending through apertures 256 and 257 respectively. After door 205 is appropriately positioned, it can be secured closed by threading thumb bolts 260 and 261 for tabs 253 and 254 until the thumb bolts 260 and 261 bottom out.

A gas flow seal between door 205 and body 206 is provided by a gasket 265, FIGS. 23 and 27, as described below.

Still referring to FIGS. 17, 19, and 20, note that bottom wall 216 of housing 203 is somewhat funnel shaped downwardly toward central, bottom, liquid drain 212. Also note that gas flow outlet port 211 extends outwardly from door 205 (FIGS. 18 and 22). Note that gas flow outwardly through outlet port 211 is directed generally orthogonal to the direction of inlet flow through inlet port 210. Although alternate constructions may be used, this is preferred for certain embodiments because it is convenient and minimizes the space occupied by housing 203.

In certain preferred embodiments, drain 212 includes a 1-way valve to permit the draining of liquid, but not the intake of liquid.

In reference again to FIG. 17, note that backwall 219 defines apertures 301, 302, 303, 304 therein, located at each respective corner of body 206. Preferably, apertures 301–304 include threaded metal inserts to prevent wear and stripping of the threads. Apertures 301–304 are provided to allow filter construction 200 to be secured in a convenient location, for example, on an engine. Filter construction 200 lends itself to be very flexible in its location. For example, housing 203 may be remotely mounted from the engine crankcase at locations anywhere to which a hose can be led. For example, housing 203 may be mounted on a firewall, or on a frame, and should be mounted above the oil sump. Preferably, housing 203 is mounted no more than 15 feet away from the engine.

Still in reference to FIG. 17, note that body 206 is constructed and arranged to receive an adapter construction 310. Adapter construction 310 includes a filter housing 311 and a valve housing 312. Projecting outwardly from filter housing 311 is an inlet tube 313, generally circumscribing gas flow inlet port 210. Each of filter housings 311 and 312 comprise circular members extending outwardly from a surrounding flange member 315. Adapter construction 310 is securely received by body 206 and attached to backside 225 of backwall 219. Methods such as ultrasonic welding secure adapter construction 310 to body 206. Valve housing 312 is for holding a bypass valve construction 285 therein, as described further below.

In general, housing 203 includes, enclosed therein, two filter constructions: an upstream coalescer filter 233 and a downstream panel filter 268. In some embodiments, coalescer filter 233 and panel filter 268 will comprise separate pieces which are separately positioned within housing 203. In other embodiments, coalescer filter 233 and panel filter 268 can be constructed adjoined to one another so that both are inserted and removed from housing 203 in a single, simultaneous operation. In the embodiment shown, coalescer filter 233 and panel filter 268 are separate, independent members or constructions.

Figure 23:
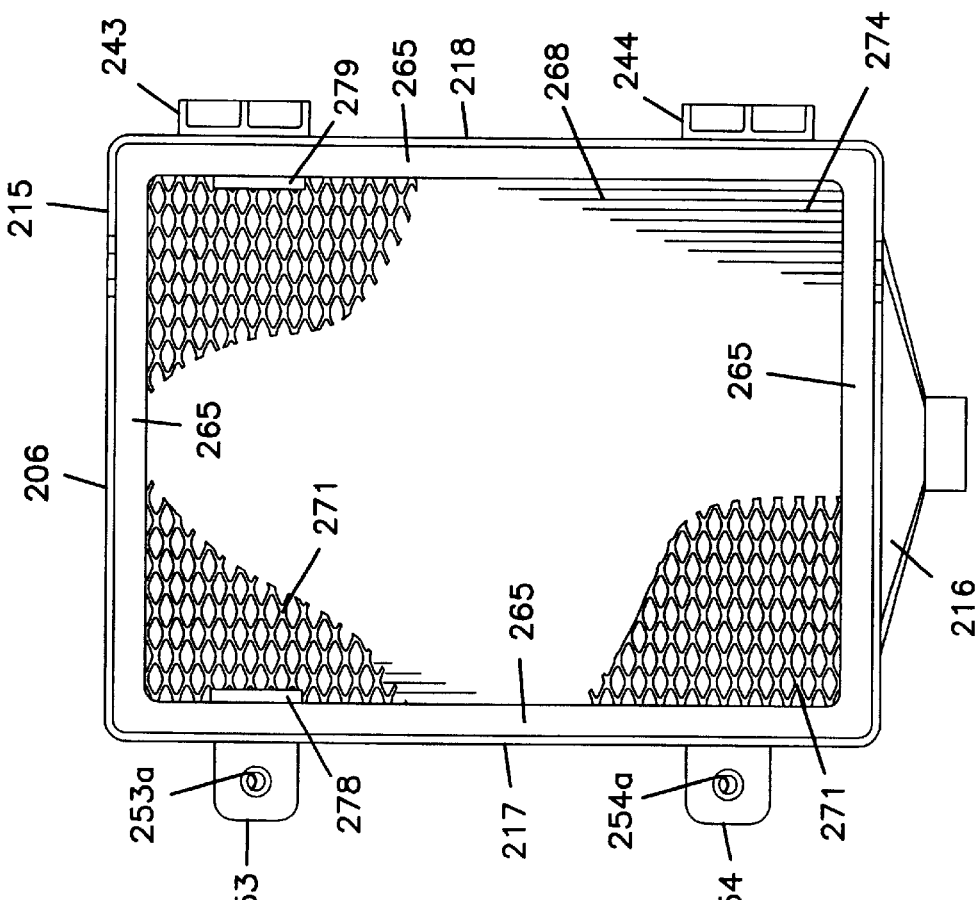
FIG. 23 is a top plan view of the body holding the second stage filter media, according to the present invention.
Figure 27:
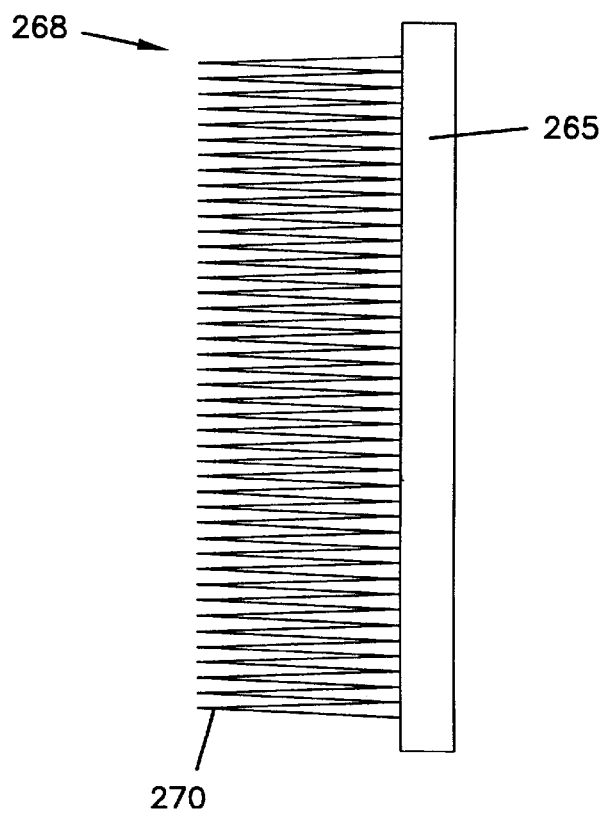
FIG. 27 is a schematic, side elevational, view of the second stage filter media, according to the present invention.

Referring to FIGS. 23 and 27, panel filter 268 comprises pleated media 270, positioned in a generally rectangular configuration. Media 270 is circumscribed by outer, rectangular gasket 265. Panel filter 268 includes a front liner or screen 271. Front screen 271 is actually positioned on a downstream side of media 270, and helps retain a rigid media configuration. A variety of materials may be used for open or porous screen 271, for example, perforated metal, expanded metal or plastic constructions. In general, plastics such as glass-filled nylon will be preferred, for reasons described below. In FIG. 23, screen 271 is depicted as partially broken away from the downstream media 270. It should be understood that, in preferred embodiments, screen 271 extends the entire surface within the perimeter of gasket 265.

Gasket 265 may comprise a variety of polymeric materials moldable to form an appropriate gasket member, with media 270 potted therein. One useful material is polyurethane such as that described in commonly assigned U.S. Pat.

No. 5,669,949 for end cap 3, hereby incorporated by reference. Material for gasket 265 includes the following polyurethane, processed to an end product (soft urethane foam) having an "as molded" density of 14–22 pounds per cubic foot (lbs/ft$^3$) and which exhibits a softness such that a 25% deflection requires about a 10 psi pressure. In some embodiments, the "as molded" density varies from the 14–22 lbs/ft$^3$ range. The polyurethane comprises a material made with I35453R resin and I3050U isocyanate. The materials should be mixed in a mix ratio of 100 parts I35453 resin to 36.2 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70–95° F. The mold temperatures should be 115–135° F.

The resin material I35453R has the following description:
(a) Average molecular weight
   1) Base polyether polyol=500–15,000
   2) Diols=60–10,000
   3) Triols=500–15,000
(b) Average functionality
   1) total system=1.5–3.2
(c) Hydroxyl number
   1) total systems=100–300
(d) Catalysts
   1) amine=Air Products 0.1–3.0 PPH
   2) tin=Witco 0.01–0.5 PPH
(e) Surfactants
   1) total system=0.1–2.0 PPH
(f) Water
   1) total system=0.03–3.0 PPH
(g) Pigments/dyes
   1) total system=1–5% carbon black
(h) Blowing agent
   1) 0.1–6.0% HFC 134A.

The I3050U isocyanate description is as follows:
(a) NCO content—22.4–23.4 wt %
(b) Viscosity, cps at 25° C.=600–800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The materials I35453R and I3050U are available from BASF Corporation, Wyandotte, Mich. 48192.

Preferably, body 206 includes perimeter trough 272 therein (FIG. 19), sized and configured to receive gasket 265. FIG. 23 shows panel filter 268 seated within trough 272 and held by body 206. FIG. 23 represents the view seen when door 205 is opened from body 206. Sealing is provided between door 205 and body 206 by compressing gasket 265 into perimeter trough 272 as the door 205 is closed.

In FIG. 23, panel filter 268 is illustrated as having optional handle structure to assist in removing panel filter 268 from trough 272 in body 206. In the particular example illustrated, handle structure includes a pair of handles or pull tabs 278, 279. Pull tabs 278, 279 are attached to screen 271 and may pivot between a collapsed position adjacent to the screen 271 and an upright position, in extension from the screen 271. Pull tabs 278, 279 are preferably constructed of a non-metallic material, such that they are incineratable. One useful material is plastic, such as glass-filled nylon.

In other embodiments, panel filter 268 does not include handle structure. The panel filter 268 is removable from the body 206 by grasping the perimeter gasket 265, or screen 271, or a combination of the two.

In an alternate embodiment, gasket 265 may comprise a foamed silicone. Foamed silicone may be useful, in circumstances where internal temperatures are high, such as over 210° F.

Preferably panel filter 268 is sized and configured so that longitudinal pleats 274 of media 270 extend vertically, i.e., between top wall 215 and bottom wall 216, when coalescer filter construction 200 is mounted for use. Advantages which are derived from this concern liquid flow, as described below.

One material useful for media 270 is a synthetic glass fiber filter medium, which is coated and corrugated to enhance performance in ambient air-oil mist conditions. The synthetic glass fiber filter media may be coated with a low surface energy material, such as an aliphatic fluorocarbon material, available from 3M of St. Paul, Minn. Prior to coating and corrugating, the media has a weight of at least 80 pounds/3000 sq. ft; no greater than about 88 pounds/3000 sq. ft; typically in a range from about 80–88 pounds/3000 square feet (136.8±6.5 grams per square meter). The media has a thickness of 0.027±0.004 inches (0.69±0.10 millimeters); a pore size of about 41–53 microns; a resin content of about 21–27%; a burst strength, wet off the machine of 13–23 psi (124–34 kPa); a burst strength wet after 5 minutes at 300° F. of 37±12 psi (255±83 kPa); a burst strength ratio of about 0.30–0.60; and a permeability of 33±6 feet per minute (10.1±1.8 meters per minute). After corrugating and coating, the media has the following properties: corrugation depth of about 0.023–0.027 inches (0.58–0.69 millimeters); a wet tensile strength of about 6–10 pounds per inch (3.6±0.91 kilograms per inch); and a dry burst strength after corrugating of no less than 30 psi (207 kPa). The pleat depth is arranged to be at least 2 inches, no greater than about 2.5 inches, and typically about 2.31 inches from tip to the outermost region of the gasket 265. The length between the pleat tip and the innermost region of gasket 265 is at least about 1.5 inches, no greater than about 2 inches, and typically about 1.8 inches. When part of an arrangement such as coalescer filter construction 200, media 270 has a face velocity of at least about 0.1 ft/min, no greater than about 5.0 ft/min, and typically in a range of about 0.1–5.0 feet per minute. Preferably, there is a face velocity of about 0.4 feet per minute.

Figure 29:
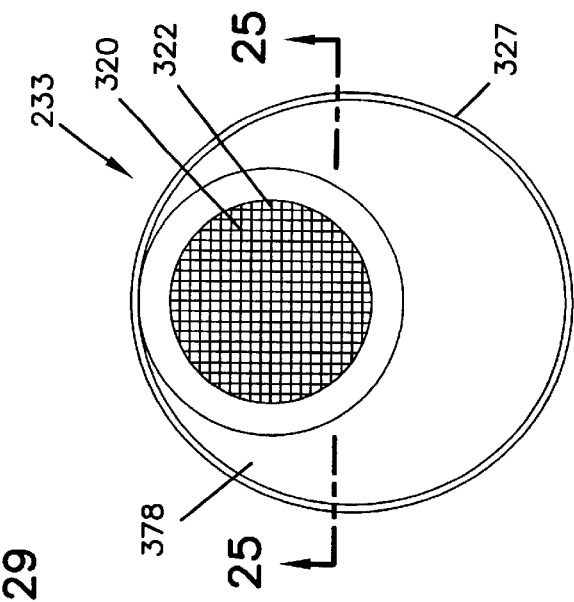
FIG. 29 is a top plan view of the first stage filter media construction, according to the present invention.
Figure 30:
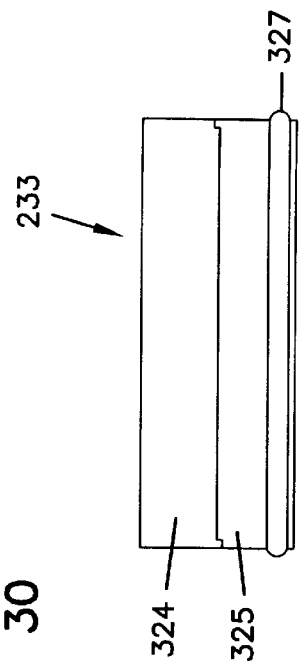
FIG. 30 is a side-elevational view of the first stage filter media construction depicted in FIG. 29, according to the present invention.
Figure 25:
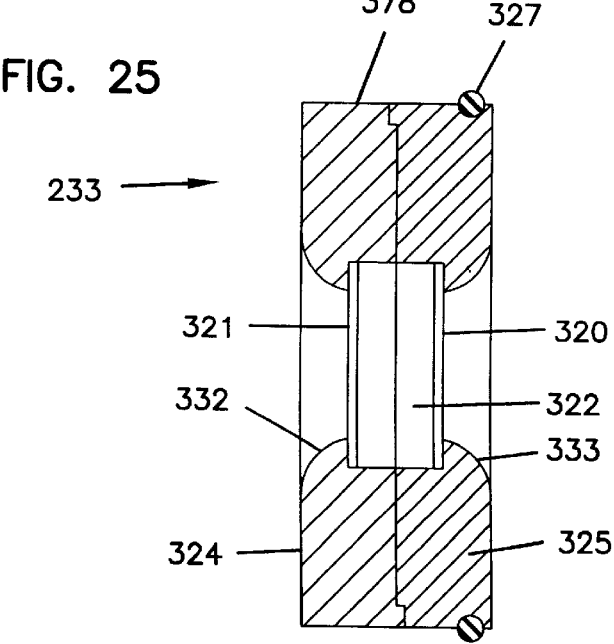
FIG. 25 is a cross-sectional, somewhat schematic, view taken along the line 25—25 of FIG. 29 of the first stage filter media, according to the present invention.
Figure 26:
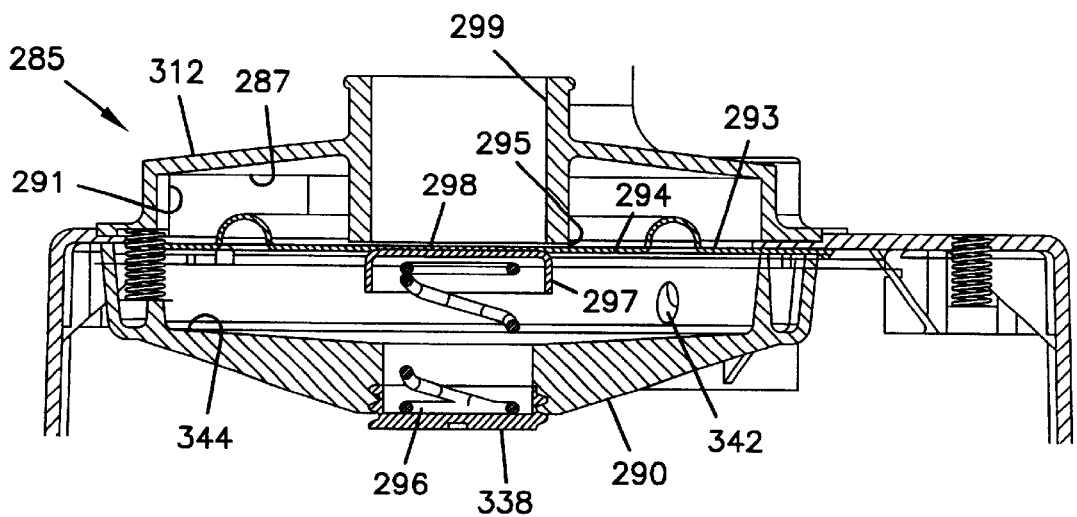
FIG. 26 is a fragmented, cross-sectional, somewhat schematic, view of an adapter member and depicting a bypass valve arrangement, according to the present invention.

Attention is now directed to coalescer filter 233. Coalescer filter 233 comprises polyester fibrous media 322, oriented in a generally circular configuration. Attention is directed to FIGS. 25, 29, and 30. Media 322 is held and encapsulated by a frame or housing construction 378 including first and second, mating housings 324, 325. Housing 325 is circumscribed by an outer O-ring or gasket 327. Coalescer filter 233 includes a pair of supports, liners, or screens 320, 321. Screens 320, 321 are positioned on both the upstream and downstream side of media 322, and help retain a rigid media configuration. A variety of materials may be used for open or porous screens 320, 321, for example perforated metal, expanded metal, or non-metallic materials such as plastic constructions. In general, non-metallic materials such as plastics, i.e., glass filled nylon, will preferred, for reasons described below.

Figure 24:
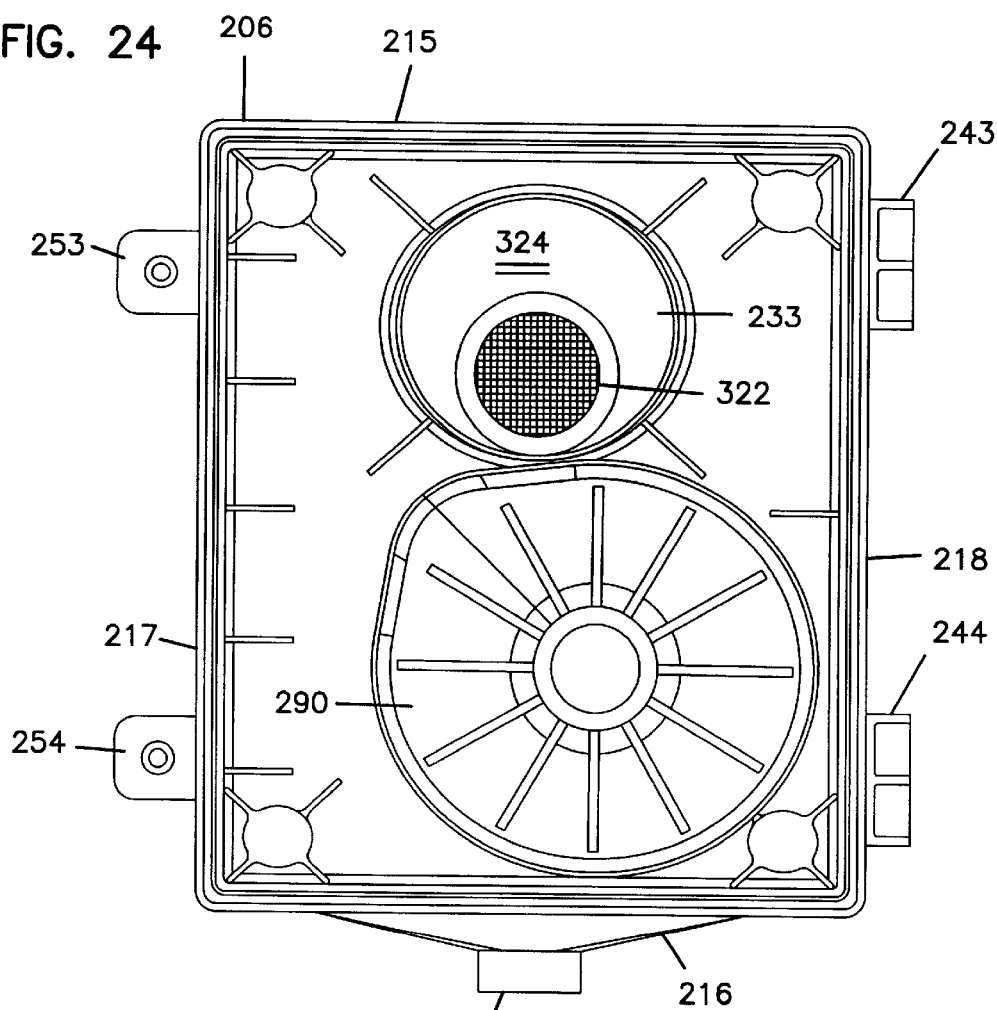
FIG. 24 is a top plan view of the filter body, analogous to FIG. 23, but with the second stage filter media removed, and showing the first stage filter media positioned in an inlet region, according to the present invention.

O-ring gasket 327 provides a seal between receiver 228 in body 206 and coalescer filter 233. FIG. 24 shows coalescer filter 233 seated within receiver 228 and housing 311. O-ring gasket 327 is compressed between and against coalescer housing 325 and the wall of housing 311 to form a radial seal therebetween. In an alternate embodiment, the O-ring gasket is sealed between and against housing 325 and receiver 328. In the embodiment illustrated, housings 324, 325 are constructed of a rigid, non-metallic material, such as plastic, for example, delrin.

In an alternate embodiment, in place of mating housings 324, 325 is a single or unitary, molded housing construction, such as a molded ring around media 322. In that embodiment, the unitary housing construction or ring is constructed of a compressible material, for example, foamed polyurethane, such as the foamed polyurethane forming perimeter gasket 265 of the panel filter 268 and described in U.S. Pat. No. 5,669,949 for end cap 3, which patent is hereby incorporated by reference. The specific polyurethane useful for the molded ring is described in detail above, with respect to gasket 265, although the "as molded" density may vary somewhat, in certain embodiments, from the range of 14–22 lbs/ft³. In this alternate embodiment, a module or patch of media 322 with screens 320, 321 on two sides encasing or encapsulating media 322 is positioned with respect to an appropriate mold, such that the polyurethane is molded around the module of media 322, and screens 320, 321. This results in a compressible housing construction, preferably circular in configuration, molded around, holding, and circumscribing the combination or module of media 322, and screens 320, 321. In this construction, the molded, foamed polyurethane ring around the media 322 is compressible to be removably mounted within housing 311 and receiver 228. The ring is then compressed between and against the wall of the receiver 228 and the media 322, to form a radial seal therebetween.

Attention is now directed to FIG. 24. Note that media 322 is a circular patch. It is positioned at the lowermost part of coalescer filter 233 and is oriented to be at a lowermost part of window 330, formed in body 206. The orientation of media 322 in this location has advantages. For example, coalescer filter 322 coalesces liquids, such as oil, from gas streams coming through gas flow inlet port 210. Due to the location of media 322 at its lowermost point in window 330, liquid which is coalesced is allowed to run off of media 322 over housing 324, and into the funnel shaped bottom wall 216 to the liquid drain 212. In FIG. 25, note the smooth shoulders 332, 333 of the housings 324, 325. This shape helps to drain the liquids coalesced within media 322. Also, by comparing FIGS. 19 and 24, it is readily apparent that media 322 is located outside of the direct force of flow traveling through gas flow inlet port 210. By this arrangement, housing 324 acts as a baffle to shield media 322 from the direct force of gas flow from the inlet port 210.

Coalescer filter 233 is shown in the illustrated embodiments as circular with an eccentrically disposed circular patch of media 322. That is, the circular patch of media 322 is positioned off-center or non-centered within the housing construction 378. However, coalescer filter 233 can be a variety of shapes and sizes. For example, housing construction 378 need not be circular, but can be other configurations. Media 322 need not be circular, but can be other shapes, such as rectangular, extending across the full extent of the diameter of housing construction 378. Further, media 322 need not be positioned in its eccentric location with respect to housing construction 378. For example, media 322 can be centered within housings 324, 325. However, the particular arrangement shown in the figures is used because it is attractive, eye catching, and distinctive.

Coalescer filter 233 is shown in top plan view in FIG. 29. The opposite side of coalescer filter 233 is a mirror-image thereof.

One type of material useable for media 322 is a polyester, fibrous media. The material has an average fiber diameter of 1.5 denier (about 12.5 micron), and a solidity in a free state of at least 0.85%. Typically, the free state solidity is less than about 1.05%. Typical free state solidities are within the range of 0.85–1.05%. It has a weight of, typically, greater than about 3.1 ounces per square yard. Typically, it has a weight less than 3.8 ounces per square yard. Typical weights are within the range of 3.1–3.8 ounces per square yard (105–129 grams per square meter). Typically, the media has a thickness at 0.002 psi compression (free thickness) of greater than about 0.32 inches. Typically, the media has a thickness at 0.002 psi compression (free thickness) of less than about 0.42 inches. Typical free thicknesses for the media are in the range of 0.32–0.42 inches (8.1–10.7 millimeters). The media has a typical permeability of no less than about 370 feet per minute (113 meters per minute).

In general, coalescer filter construction 200 further includes bypass valve construction 285 therein. Bypass valve construction 285 is provided in fluid flow communication with volume 230 and interior volume 336 of housing 311 at a position upstream from coalescer filter 233. This is provided by duct 287, FIGS. 17 and 26. Duct 287 is provided in fluid flow communication with port 288 positioned adjacent to volume 230 between coalescer filter 233 and gas flow inlet port 210.

Bypass valve construction 285 further includes bypass valve receiver 290, also in fluid flow communication with duct 287, via port 291. Port 291 is provided on an upstream side of valve member 293. Valve member 293 comprises a flexible diaphragm 294 sealed against seat 295 and held or retained there against by spring 296 and a cup 297. A plug 338 is received by the receiver 290, and provides a back surface for the spring 296 to compress against. Downstream side 298 of diaphragm 294 is provided a gas flow bypass outlet 299. A hole 340 is provided through the adapter construction 310 (FIGS. 17 and 19). The hole 340 is in airflow communication with aperture 342 in the receiver 290. Hole 340 vents to atmosphere, which is in airflow communication with aperture 342. Aperture 342 provides an inlet port into volume 344 behind diaphragm 294. Therefore, the pressure of volume 344 is at atmospheric levels.

In ordinary use, gas flow outlet through bypass outlet 299 is blocked by diaphragm 294, under pressure from spring 296. However, should the pressure within duct 287 exceed a designed limit, diaphragm 294 will be biased away from seat 295 sufficiently to allow gas flow directly to bypass outlet 299 without passage through coalescer filter 233. Thus, should pressure build up sufficiently within inlet port 210, for example as a result of restriction due to coalescer filter 233 and/or panel filter 268 becoming sufficiently occluded, bypass valve construction 285 will protect engine seals and equipment by allowing a bypass venting through bypass outlet 299.

Figure 28:
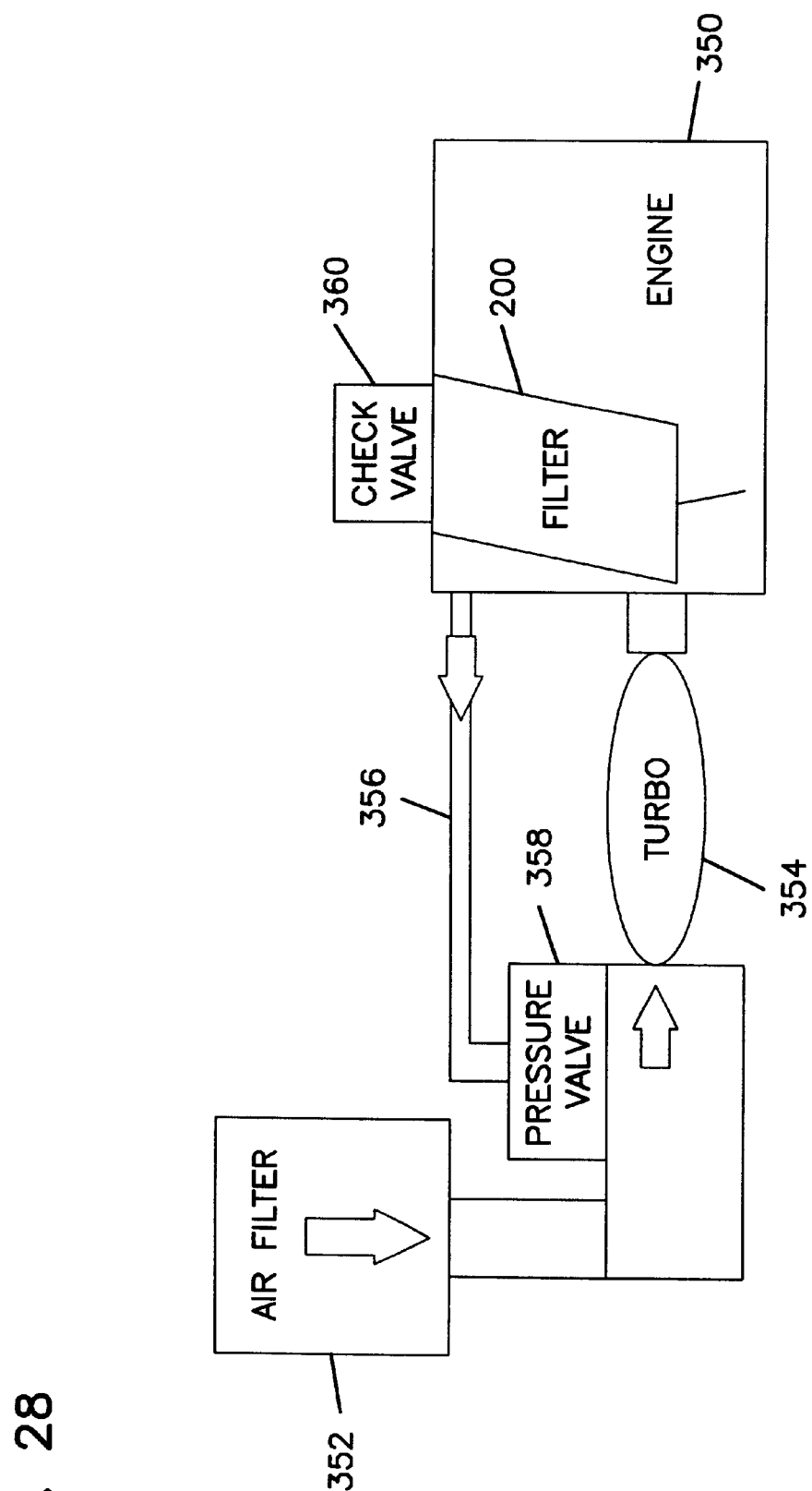
FIG. 28 is a schematic view of an engine system using the filter arrangement, according to the present invention.

Attention is now directed to FIG. 28. In FIG. 28 is a schematic diagram showing one possible application of the coalescer filter construction 200 of the present invention. Block 350 represents a turbocharged diesel engine. Air is taken to the engine 350 through an air filter 352. Air filter or cleaner 352 cleans the air taken in from the atmosphere. A turbo 354 draws the clean air from the air filter 352 and pushes it into engine 350. While in engine 350, the air undergoes compression and combustion by engaging with pistons and fuel. During the combustion process, the engine 350 gives off blow-by gases. Filter 200 is in gas flow communication with engine 350 and cleans the blow-by gases. From filter 200, the air is directed through channel 356 and through a pressure valve 358. From there, the air is again pulled through by the turbo 354 and into the engine

350. Regulator valve or pressure valve 358 regulates the amount of pressure in the engine crankcase 350. Pressure valve 358 opens more and more, as the pressure in the engine crankcase increases, in order to try to decrease the pressure to an optimal level. The pressure valve 258 closes to a smaller amount when it is desirable to increase the pressure within the engine. A check valve 360 is provided, such that when the pressure exceeds a certain amount in the engine crankcase 350, the check valve 360 opens to the atmosphere, to prevent engine damage.

A. Example Operation

In operation, coalescer filter construction 200 works as follows. Blow-by gases from an engine crankcase are taken in through gas flow inlet port 210. The gases pass through coalescer filter 233. Coalescer filter 233 separates liquids, with any entrained solids, from the rest of the gas stream. The liquid flows off of the media 322, over the housing 324, along the front side of the back wall 219, along the funnel shaped bottom wall 216, and down through the liquid drain 212. This liquid material often is oil, and may be recycled to the crankcase to be reused. The gas stream which is not coalesced by coalescer 233 continues on to the second stage filter or panel filter 268. Panel filter 268 removes additional particles and solids from the gas stream. Panel filter 268 has vertical pleats, such that particles and any further liquid collects or agglomerates on the pleats and falls or drains by gravity downwardly toward the drain 212. The gas then exits through gas flow outlet port 211. From there, the gases may be directed, for example, to the turbo of an engine intake system.

Should either the coalescer filter 233 or the panel filter 268 become clogged or occluded, pressure will fill duct 287, which will apply force on diaphragm 294 against spring 296. Eventually, the force will move the diaphragm away from its seat 295 and permit the gas to flow through bypass outlet 299.

The coalescer filter and the panel filter 268 are changed out as follows. The door 205 is removed from the body 206 by unscrewing thumbolts 260, 261. The door 205 is then pivoted by way of hinge tabs 240, 241 and receivers 243, 244. The view is then as shown in FIG. 23. That is, the downstream side of the panel filter 268 is viewable. In one embodiment, the panel filter 268 and coalescer filter 233 are separate, independent members. Therefore, the panel filter 268 is removed from the body 206 and disposed of. This may be done, for example, by grasping pull tabs 278, 279 and pulling panel filter 268 from trough 272. The person changing the filters then has the view as shown in FIG. 24. That is, the coalescer filter 233 is sealed in place within receiver 228 and housing 311. The coalescer filter 233 is then removed from the receiver 228 and disposed of. A second, new coalescer filter is oriented within the housing 311 and receiver 328 as shown in FIG. 24. A gasket between the coalescer filter and the receiver 228 forms a seal as the coalescer filter is properly installed. Next, a second, new panel filter 268 is oriented within the perimeter trough 272 of the body 206. This is shown in FIG. 23. The door 205, is then pivoted on its pivot arrangement between the hinge tabs 240, 241 and receivers 243, 244 into a closed position (FIGS. 17 and 18). The thumbolts 260, 261 are turned within apertures 253a, 254a, and tightened to form a seal with gasket member 265 between door 205 and body 206.

When disposing of the coalescer filter 233 and panel filter 268, preferably these constructions consist of non-metallic material at least 95% non-metallic, more preferably at least 98%, and typically 99% or 100% by weight non-metallic material. When the screens 271, 320, 321 are constructed of non-metallic materials, such as plastic, and each of the coalescer filter 233 and panel filter 268 is completely non-metallic, the coalescer filter 233 and panel filter 268 are completely incineratable, leaving little residue. This provides for convenient and clean disposal of coalescer filter 233 and panel filter 268, and does not take up land-fill space.

In an alternate embodiment, the coalescer filter 233 and panel filter 268 are attached or secured to one another. In this embodiment, removing the panel filter 268 removes the coalescer filter as well. The combination of the panel filter 268 and coalescer filter 233 is removed from body 206 and disposed of (by, for example, incineration). A second, different combination of panel filter 268 secured to coalescer filter 233 is inserted or placed or installed in body 206, by orienting coalescer filter 233 in housing 311 and receiver 228, and creating the seal therebetween. As this is done, the panel filter 268 is oriented within perimeter trough 272. The door 205 is closed over the body 206, and tightened against gasket member 265. This forms a seal between body 206 and door 205.

B. A Specific Example

One specific example for a coalescer filter construction 200 is described herein. Of course, a wide variety of arrangements and dimensions are included within the scope of the present invention.

The coalescer filter 200 is useful on a 300 horsepower Caterpillar 3406B engine. The engine has a piston displacement of at least 14.0 liters, typically 14.6 liters with 6 cylinders. It typically takes at least 35 quarts of oil, and typically about 40 quarts of oil. The engine uses a Schwitzer turbo charger.

The coalescer filter construction 200 is particularly applicable to turbo charged, diesel engines having at least 50 horse power. This would include class 2 trucks up to class 8 trucks, and higher.

Engines other than turbo charged diesel engines may have applications for the coalescer filter construction 200 of the present invention. For example, natural gas engines or gasoline engines can also use the filter construction 200. In preferred applications, the coalescer filter construction 200 will be used for large engines, that is engines of a size class 8 or above. Typical exhaust flow rates for engines of class 8 or above are at least 2000 cfm, and are typically 2000–3000 cfm. Medium sized engines, that is engines of a class 6–8, may also be used with filter construction 200. Medium sized engines of a class of 6–8 have exhaust flow rates of typically at least 1000 cfm; often, no greater than 2000 cfm. A typical class 6–8 sized engine has an exhaust flow rate of between 1000–2000 cfm. Smaller engines in the range of the class 4–6 also have applications for the filter construction 200. Typical exhaust flow rates for class 4–6 engines which the filter construction 200 may be used are at least 1000 cfm; often, the exhaust flow rates are no greater than 1500 cfm. A small sized engine (class 4–6) has exhaust flow rates of typically 1000–1500 cfm.

One filter construction 200 tested in accordance with the present invention ran for 600 hours at 87% efficiency, by weight of oil. The construction 200 operated for 600 hours until the crankcase pressure increased from 3 inches of water to 5 inches of water. That is, there were 2 inches of water to work with.

It should be understood that the crankcase internal pressure is application specific. In certain applications, such as systems where there is not much dust or debris in the air, such as in marine systems, the crankcase may have a negative pressure (that is, about −2 to −3 inches of water). In other applications, such as systems where there is an abundant amount of dust or debris in the ambient air, such as off-road trucks or city buses, the crankcase has a positive pressure. The filter construction 200 is flexible to allow it to operate with either positive crankcase pressures, such as those typically found in turbo charged diesel trucks or off-road vehicles, or negative pressures, such as those found in marine engines.

It will be understood that a wide variety of specific configurations and applications are feasible, using techniques described herein. The following dimensions are typical examples. The ranges are preferred because they have been satisfactory to perform the job, without resulting in a structure larger or more expensive than necessary. Although ranges outside of those discussed below are contemplated, the following are convenient and typical.

Door 205 has a width between about 6–9 inches, typically about 7 inches. It has a length of between about 8–11 inches, typically about 9.5 inches. Door 205 has a depth of about 2–3 inches, typically about 2.4 inches. The gas flow outlet port 211 has a diameter of about 1 inch.

The body 206 has a width of at least 6 inches, no greater than about 9 inches, typically about 6–9 inches, and typically about 7 inches. It has a length of at least about 8 inches, no greater than about 11 inches, typically about 8–11 inches, and typically about 9 inches. It has a depth of at least about 2.5 inches, no greater than about 4 inches, typically between about 2.5–4 inches, and typically about 3.2 inches. Drain 212 has a diameter of at least 0.5 inches, no greater than about 2 inches, typically between about 0.5–2 inches, and typically about 1.2 inches. Window 330 has a diameter of at least 2.5 inches, no greater than about 3 inches, typically about 2.5–3 inches, and typically about 2.7 inches.

When assembled together, door 205 and body 206 have a depth of at least 5 inches, no greater than 8 inches, typically between about 5–8 inches, and typically about 6.4 inches.

Panel filter 268 has a length including the gasket 265 of at least about 8 inches, no greater than about 11 inches, and typically between about 8–11 inches, often about 9 inches. It has a width of at least 6 inches, no greater than about 8 inches, and often about 7 inches. The pleated filter has at least about 40 pleats, no greater than about 70 pleats, typically about 45–60 pleats, and specifically about 52 pleats. Each of the pleats has a pleat depth of at least about 1.5 inches, no greater than about 3 inches, typically within the range of about 2.0–2.5 inches, and often about 2.3 inches. The pleat length is at least 7 inches, no greater than 9 inches, typically within the range of about 7–8.5 inches, and often about 8.3 inches. The pleated filter 268 has a perimeter, circumferential area within a range of about at least 35 square inches, no greater than about 75 square inches, typically about 40–70 square inches, and often about 42 square inches. The pleated media 270 has an upstream media surface at least about 10 square feet, no greater than about 15 square feet, typically within a range of about 10–15 square feet, and preferably about 12 square feet.

Coalescer filter 233 includes a housing with a circular outer diameter of at least 2 inches, no greater than about 4 inches, typically within a range of 2–4 inches, and typically about 3 inches. The thickness of the coalescer filter 233 is at least about 0.5 inches, no greater than about 1.5 inches, typically within a range of 0.5–1.5 inches, and preferably about 1 inch. The diameter of media 322 is at least about 1 inch, no greater than about 2 inches, typically in a range of 1–2 inches, and typically about 1.4 inches. The thickness across media 322 is at least about 0.5 inches, no greater than about 0.7 inches, and typically about 0.5–0.6 inches thick. The media 322 comprises fibers having an average fiber size of about 12.5 micron and a percent solidity, free state, of no greater than about 1.05%. The media 322 has an upstream, exposed surface area of at least 1 sq. in., no greater than about 2.5 sq. in., typically about 1–2 square inches, and typically about 1.5 square inches.

The coalescer filter 233 has an upstream media surface area at least about 0.4%, no greater than about 1.5%, typically within the range of about 0.5–1%, and typically about 0.8% of the upstream media surface area of the pleated media 270.

The adapter construction 310 has a distance between respective centers of the filter housing 311 and valve housing 312 of at least about 3 inches, no greater than about 5 inches, typically about 3–5 inches, and typically about 4 inches. The filter housing 311 has a diameter of about 2–4 inches, typically about 3.1 inches. The valve housing 312 has a diameter of about 3–5 inches, typically 4.2 inches. The inlet port 210 has a diameter of about 0.5–1.5 inches, typically about 1 inch. The bypass valve outlet port 299 has a diameter of about 1–2 inches, typically 1.4 inches. The receiver 290 has a diameter of 4–6 inches, typically about 4.7 inches. It has an overall thickness of 0.5–1.5 inches, typically about 1.1 inches. The spring 296 has a diameter of about 0.5–1 inches, typically about 0.8 inches. It has an axial length in an uncompressed state of about 0.75–1.25 inches, typically about 1.1 inches. The diaphragm 294 has a diameter of about 4.5–5.25 inches, typically about 4.7 inches.

Other embodiments of the invention will be apparent to those skilled in the art from consideration of the specification and practice of the invention disclosed herein.

We claim:

1. An arrangement for use in separating a hydrophobic liquid aerosol phase, from a gas stream, during filtration of engine crankcase gases by passage of the gas stream into a first stage coalescer filter and then into a pleated upstream surface of a second stage filter; the arrangement comprising:
  (a) a cylindrically shaped first stage coalescer filter having a framework defining a first upstream face, a second, opposite, downstream face and a closed outer periphery;
    (i) the first stage coalescer filter having a flow passageway extending therethrough from the first upstream face to the second downstream face;
    (ii) an upstream open screen at said upstream face and an opposite downstream open screen at the downstream face;
    (iii) a non-pleated, non-woven fibrous bundle positioned in the flow passageway between the upstream open screen and the downstream open screen; and, circumscribed by the closed outer periphery of the framework; and,
  (b) a second stage filter comprising pleated media configured in a cylinder and having a pleated upstream surface for receiving gas flow from the first stage coalescer filter; the pleated upstream surface having a second upstream surface area;
    (i) the area of first upstream surface being no more than about 10% of the area of second upstream surface; and
    (ii) the cylinder of pleated media being potted in, and extending between, first and second, opposite, polymeric end caps;
      (A) said first end cap having a radial seal portion thereon.

2. An arrangement according to claim 1 wherein:
  (a) the first end cap, of the second stage filter, is an open end cap including an aperture extending therethrough; and, (b) the radial seal portion is positioned in the aperture in the first end cap.

3. An arrangement according to claim 2 wherein:
(a) the non-woven fibrous bundle of the coalescer filter has a thickness of no greater than 0.7 inches.

4. An arrangement according to claim 2 including:
(a) a housing construction defining an interior and having a gas flow inlet and a gas flow outlet;
   (i) the first stage coalescer filter and the second stage filter being operably positioned within the housing interior.

5. An arrangement according to claim 4 wherein:
(a) the first stage coalescer filter and the second stage filter are positioned in the housing for gas flow from the first stage coalescer filter to an outside surface of the pleated media cylinder of the second stage filter.

6. An arrangement according to claim 4 further including:
(a) a liquid collection arrangement oriented to receive liquid coalesced in the first stage coalescer filter;
(b) a liquid drain in fluid flow communication with the liquid collection arrangement to drain coalesced liquid from the housing construction interior; and, wherein,
   (i) the first stage coalescer filter and the second stage filter are non-permanently positioned in the housing interior to be removable from, and to be replaceable in, the housing construction interior.

7. An arrangement according to claim 6 wherein:
(a) the first stage coalescer filter and the second stage filter are separate constructions.

8. An arrangement according to claim 1 wherein:
(a) the first stage coalescer filter and the second stage filter are mechanically connected to be replaced as one unit.

9. An arrangement for use in separating a hydrophobic liquid aerosol phase, from a gas stream, during filtration of engine crankcase gases by passage of the gas stream into a first stage coalescer filter and then into a pleated upstream surface of a second stage filter; the arrangement comprising:
(a) a first stage coalescer filter comprising a housing having a circumferential seal member and defining a flow passageway therethrough;
   (i) the first stage coalescer filter including a non-woven fibrous bundle extending across the flow passageway;
   (ii) the non-woven fibrous bundle having a first upstream surface area; and,
(b) a second stage filter comprising pleated media configured as a rectangular panel filter with a pleated upstream surface for receiving gas flow from the first stage coalescer filter; the pleated upstream surface of the pleated media having a second upstream surface area;
   (i) the first upstream surface area having a value of 0.1%–10% of the value of the second upstream surface area.

10. An arrangement according to claim 9 wherein:
(a) the pleated media comprises a glass fiber filter media.

11. An arrangement according to claim 10 wherein:
(a) said second stage filter comprises a replaceable filter element comprising:
   (i) an outer perimeter;
   (ii) a pleat depth of at least 1.5 inches;
   (iii) an area within the outer perimeter of at least 35 square inches; and
   (iv) an outer gasket member comprising polyurethane material positioned along said outer perimeter.

12. An arrangement according to claim 9 including:
(a) a housing comprising a body and a removable cover mounted on the body;
   (i) the housing including a gas flow inlet port, a gas flow outlet port and a separate liquid flow outlet drain.

13. An arrangement according to claim 12 wherein:
(a) the body has a rectangular outer periphery.

14. An arrangement according to claim 13 wherein:
(a) the gas flow outlet port is in the cover; and,
(b) the gas flow inlet port and the liquid flow outlet port are in the body.

15. An arrangement according to claim 12 wherein:
(a) the non-woven fibrous bundle comprises polyester fibers.

16. An arrangement according to claim 12 wherein:
(a) the first stage coalescer filter housing comprises a two-piece plastic housing framework having the non-woven fibrous bundle positioned therein.

17. An arrangement according to claim 16 wherein:
(a) the first stage coalescer filter includes a first upstream screen and a second downstream screen;
   (i) the non-woven fibrous bundle being positioned between the first upstream screen and the second downstream screen.

18. An arrangement according to claim 12 wherein:
(a) the coalescer filter is a separate member from the second stage filter element; and
(b) the housing is configured so that the coalescer filter can be removed from the housing interior only after the second stage filter element has been removed from the housing interior.

19. An arrangement according to claim 19 wherein:
(a) the non-woven fibrous web has a thickness of no greater than 0.7 inches.

20. An arrangement according to claim 19 wherein:
(a) the coalescer filter and the second stage filter, together, are at least 99%, by wt., non-metallic.

* * * * *

UNITED STATES PATENT AND TRADEMARK OFFICE
CERTIFICATE OF CORRECTION

PATENT NO. : 6,540,801 B2
DATED : April 1, 2003
INVENTOR(S) : Steven Scott Gieseke and Robert Allen Dushek It is certified that error appears in the above-identified patent and that said Letters Patent is hereby corrected as shown below:

Column 10,
Line 10, delete "strengh" and insert -- strength --.

Column 22,
Line 49, delete "claim 19" and insert -- claim 9 --.

Signed and Sealed this

Ninth Day of September, 2003

JAMES E. ROGAN
*Director of the United States Patent and Trademark Office*